United States Patent
Jang et al.

(10) Patent No.: US 9,210,677 B2
(45) Date of Patent: Dec. 8, 2015

(54) METHOD AND APPARATUS FOR REDUCING UPLINK TRANSMISSION DELAY IN WIRELESS COMMUNICATION SYSTEM USING CARRIER AGGREGATION

(75) Inventors: Jae Hyuk Jang, Suwon-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 14/008,144

(22) PCT Filed: Apr. 5, 2012

(86) PCT No.: PCT/KR2012/002555
§ 371 (c)(1),
(2), (4) Date: Sep. 27, 2013

(87) PCT Pub. No.: WO2012/138134
PCT Pub. Date: Oct. 11, 2012

(65) Prior Publication Data
US 2014/0016559 A1   Jan. 16, 2014

Related U.S. Application Data

(60) Provisional application No. 61/471,872, filed on Apr. 5, 2011.

(30) Foreign Application Priority Data

Apr. 5, 2012   (KR) .................. 10-2012-0035217

(51) Int. Cl.
*H04W 80/04*   (2009.01)
*H04W 88/06*   (2009.01)
(Continued)

(52) U.S. Cl.
CPC ......... *H04W 56/0015* (2013.01); *H04L 1/1835* (2013.01); *H04L 1/1851* (2013.01); *H04L 1/1854* (2013.01); *H04L 1/1874* (2013.01);
(Continued)

(58) Field of Classification Search
CPC ...................... H04W 56/0005; H04W 56/0045
See application file for complete search history.

(56) References Cited

U.S. PATENT DOCUMENTS

2010/0177747 A1   7/2010   Chun et al.
2011/0200032 A1*   8/2011   Lindstrom et al. ............ 370/350

FOREIGN PATENT DOCUMENTS

KR   10-2009-0019841 A   2/2009
WO   2010-107700 A2   9/2010
(Continued)

OTHER PUBLICATIONS

ZTE, Discussion on Multiple TA, 3GPP TSG-RAN WG2 Meeting #73bis, R2-111908, Apr. 4, 2011, Shanghai, China.
(Continued)

*Primary Examiner* — Maharishi Khirodhar
(74) *Attorney, Agent, or Firm* — Jefferson IP Law, LLP

(57) ABSTRACT

The present invention proposes a method of sending a UE the timing advance information per carrier group promptly and commanding preamble transmission, and activating secondary carriers in a wireless communication system supporting carrier aggregation technology using uplink transmission timings for the respective carrier groups. Through the present invention, the UE is capable of configuring the timing advance information of the carrier group promptly and activating the secondary carrier quickly, resulting in reduction of uplink transmission delay.

12 Claims, 19 Drawing Sheets

(51) Int. Cl.

| | |
|---|---|
| *H04W 88/08* | (2009.01) |
| *H04W 56/00* | (2009.01) |
| *H04L 5/00* | (2006.01) |
| *H04W 74/08* | (2009.01) |
| *H04L 1/18* | (2006.01) |
| *H04W 52/02* | (2009.01) |
| *H04W 52/50* | (2009.01) |
| *H04L 27/26* | (2006.01) |
| *H04W 48/08* | (2009.01) |
| *H04W 52/36* | (2009.01) |
| *H04W 72/00* | (2009.01) |
| *H04W 72/04* | (2009.01) |
| *H04W 76/06* | (2009.01) |
| *H04W 74/00* | (2009.01) |

(52) U.S. Cl.
CPC .............. *H04L 1/1883* (2013.01); *H04L 5/001* (2013.01); *H04L 5/0098* (2013.01); *H04W 52/0216* (2013.01); *H04W 52/0219* (2013.01); *H04W 52/50* (2013.01); *H04W 56/001* (2013.01); *H04W 56/0005* (2013.01); *H04W 56/005* (2013.01); *H04W 56/0045* (2013.01); *H04W 74/0833* (2013.01); *H04W 74/0858* (2013.01); *H04L 27/2662* (2013.01); *H04W 48/08* (2013.01); *H04W 52/367* (2013.01); *H04W 72/00* (2013.01); *H04W 72/04* (2013.01); *H04W 74/006* (2013.01); *H04W 76/068* (2013.01); *H04W 88/08* (2013.01)

(56) References Cited

FOREIGN PATENT DOCUMENTS

| | | | |
|---|---|---|---|
| WO | 2010-143821 A2 | 12/2010 | |
| WO | 2010-148404 A1 | 12/2010 | |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 10), 3GPP TS 36.321, Dec. 17, 2010, p. 12-17, V10.0.0 (Dec. 2010), Sophia Antipolis, France.

E-Mail Rapporteur (NTT DOCOMO et al), CA support for multi-TA, 3GPP TSG-RAN2#69, R2-101567, Feb. 18, 2010, sections 1.2, 2.1, 2.4-2.6, San Francisco, USA.

Alcatel-Lucent et al, DL reference & the need of TA grouping for multiple TA, TSG-RAN WG2#73bis, R2-112208, Apr. 4, 2011, section 3, Shanghai, China.

Qualcomm Incorporated, Supporting multiple timing advance groups, 3GPP TSG-RAN WG2 meeting#68bis, R2-100423, Jan. 12, 2010, p. 2-3, Valencia, Spain.

Pantech, Considerations on Multiple TA, 3GPP TSG RAN WG2 Meeting #73bis, R2-112275, Apr. 5, 2011, section 2, Shanghai, China.

Huawei, the Multiple Time Advances in Carrier Aggregation, 3GPP TSG-RAN WG2 Meeting #73bis, R2-111953, Apr. 5, 2011, sections 2.1 and 2.2, Shanghai, China.

* cited by examiner

METHOD AND APPARATUS FOR REDUCING UPLINK TRANSMISSION DELAY IN WIRELESS COMMUNICATION SYSTEM USING CARRIER AGGREGATION

CROSS-REFERENCE TO RELATED APPLICATIONS

This application claims the benefit under 35 U.S.C. §371 of an PCT patent application filed on Apr. 5, 2012 and assigned Serial number PCT/KR2012/002555, which claims priority to a United States provisional patent application filed Apr. 5, 2011 and assigned Ser. No. 61/471,872, the entire disclosure of which is hereby incorporated by reference, and under 35 U.S.C. §119(a) of a Korean patent application filed on Apr. 5, 2012 in the Korean Intellectual Property Office and assigned Serial number 10-2014-0048351, the entire disclosure of which is hereby incorporated by reference.

TECHNICAL FIELD

The present invention relates to a wireless communication system and, in particular, to a method and apparatus for operating plural time alignment timers in a Long Term Evolution (LTE) system using a plurality of carriers.

BACKGROUND ART

With the rapid advance of radio communication technology, the communication system has highly evolved. LTE is one of the promising $4^{th}$ generation mobile communication technologies. In an LTE system, various techniques are adopted to meet the explosively increasing traffic demands, and carrier aggregation is one of such techniques. The carrier aggregation is used to flexibly expand available bandwidth by aggregating multiple secondary carriers with a primary carrier, unlike the legacy LTE system using a single carrier, between a User Equipment (UE) and an evolved Node B (eNB). In LTE, the primary carrier is referred to as primary cell (PCell) and the secondary carrier as secondary cell (SCell).

Meanwhile, in case that the locations of the eNB apparatuses using the primary and secondary carriers are different from each other due to the deployment of repeaters and Remote Radio Head, it may be necessary to change the uplink transmission timing. For example, when the eNB apparatus configured with the primary carrier and another eNB apparatus configured with the secondary carrier are located at different places, it may cause problem in transmission timing depending on the location of the UE since the uplink signal addressed to the remote eNB apparatus should be transmitted earlier than the signal addressed to the near eNB apparatus. In such case that a plurality of uplink timings for different carriers exists, if the uplink timings are configured individually, this increases uplink transmission delay thus there is a need of reducing the uplink transmission delay.

DISCLOSURE OF INVENTION

Technical Problem

The present invention has been conceived to overcome the above problem, and it is an object of the present invention to provide a method of adjusting and activating a plurality of uplink timings and a concrete method for Contention Resolution in transmitting preamble in a wireless mobile communication system supporting carrier aggregation technology.

Solution to Problem

The present invention uses following methods for adjusting an uplink timing advance value promptly.

Embodiment 1: To include the information on an uplink timing delta value (i.e. offset value) relative to a currently activated cell (e.g. Primary Cell (PCell) including a primary carrier) in the Radio Resource Control (RRC) layer message (or carrier aggregation configuration control message) for adding a specific carrier (hereinafter, referred to as cell) in configuring carrier aggregation.

Embodiment 2: To include the information on an uplink timing delta value (i.e. offset value) relative to a currently activated cell (e.g. Primary Cell (PCell) including a primary carrier) in the Activation/Deactivation MAC Control Element (CE) message (or carrier activation message).

Embodiment 3: To include a Random Access Preamble id and resource index information in the Activation/Deactivation MAC CE for activating the carrier aggregation-configured cell to replace the role of the PDCCH order.

Embodiment 4: If a PDCCH order is received through a deactivated cell among carrier aggregation-configured cells, this indicates activation of the corresponding cell implicitly.

Embodiment 5: To redefine the contention resolution operation of the UE: If a PDCCH order for an SCell is received, it is assumed that the content resolution is successful only when the corresponding PDCCH is the PDCCH for the corresponding SCell or the PDCCH for other SCells in the same TAG including the corresponding SCell.

In more detail, in accordance with an aspect of the present invention, an uplink transmission method of a terminal in a wireless communication system supporting carrier aggregation technology with a primary cell and at least one secondary cell includes receiving a timing information for used in calculating timing advance of the secondary cell, calculating the timing advance of the second cell using the timing information, and transmitting the uplink data by adjusting uplink timing according to the timing advance of the secondary cell while a time alignment timer of the secondary cell is running.

In accordance with another aspect of the present invention, a terminal for transmitting uplink data in a wireless communication system supporting carrier aggregation technology with a primary cell and at least one secondary cell includes a transceiver which transmits and receive to and from a base station and a controller which controls receiving a timing information for used in calculating timing advance of the secondary cell, calculating the timing advance of the second cell using the timing information, and transmitting the uplink data by adjusting uplink timing according to the timing advance of the secondary cell while a time alignment timer of the secondary cell is running.

Advantageous Effects of Invention

The proposed method is capable of performing the timing advance and carrier activation promptly when a plurality of timings are required to be adjusted, resulting in reduction of uplink transmission delay in the corresponding cell.

MODE FOR THE INVENTION

Hereinafter, exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

This aims to omit unnecessary description so as to make the subject matter of the present invention clear. Detailed descriptions on the embodiments of the present invention are made hereinafter with reference to accompanying drawings.

Figure 1:
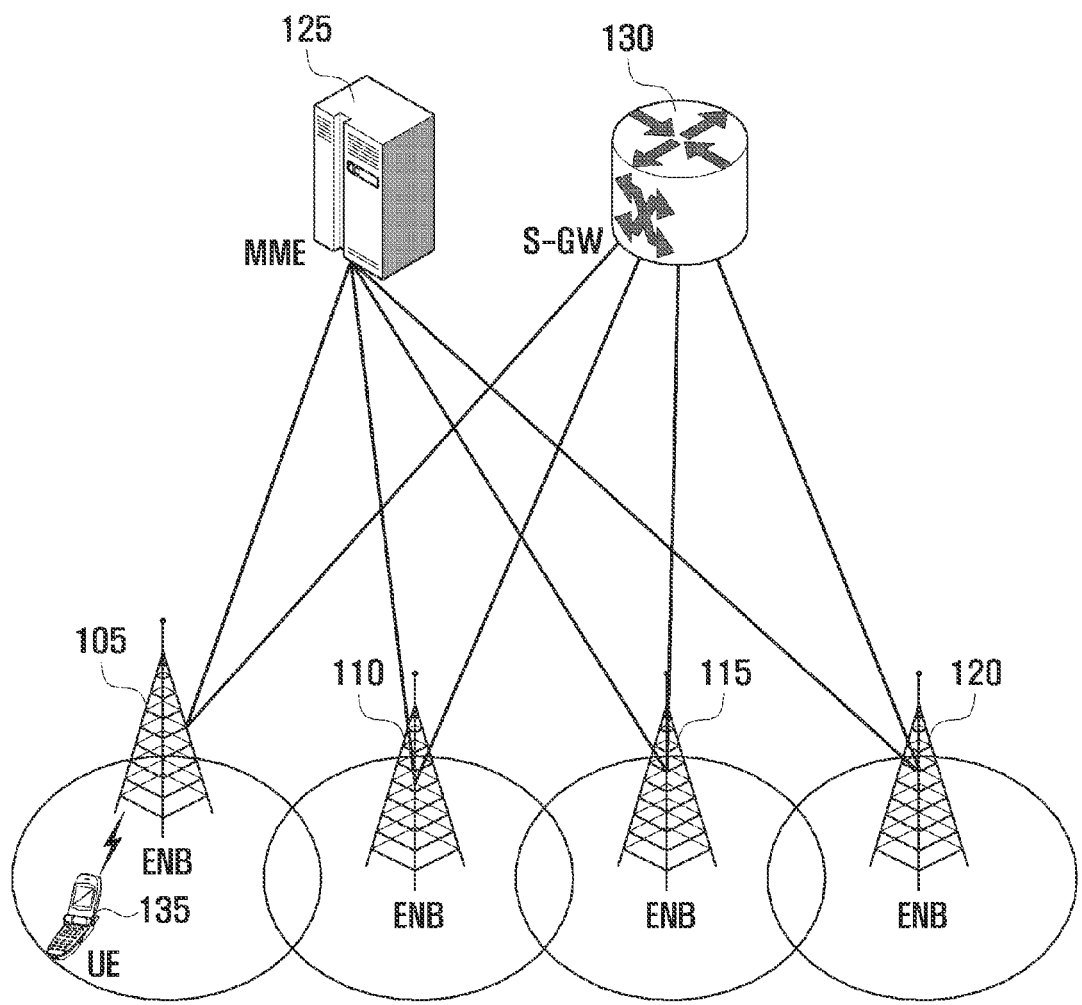
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
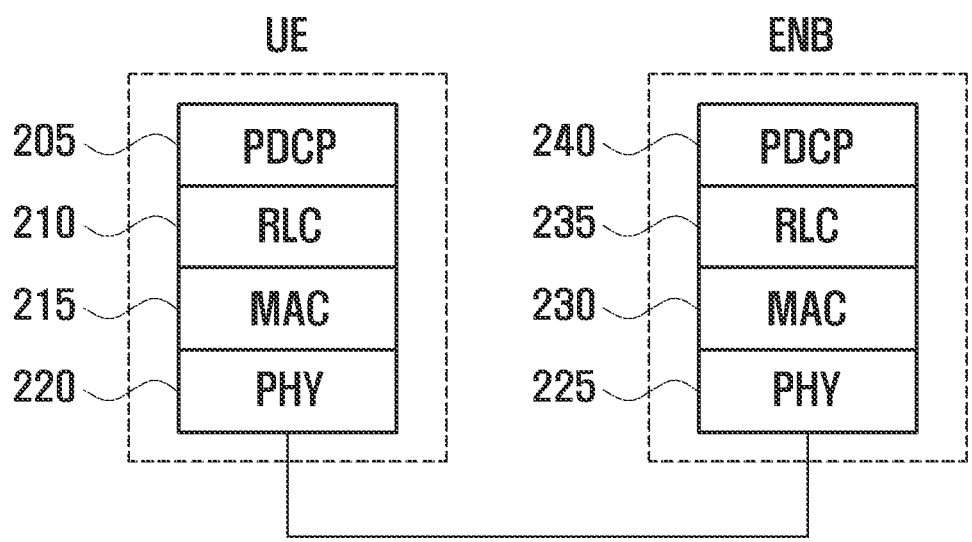
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. ARQ is the technique for checking whether the packet transmitted by the transmitted is received by the received successfully and retransmitting the packets received erroneously. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel (PHICH), and the uplink HARQ ACK/NACK corresponding to downlink transmission is carried Physical Uplink Control Channel (PUCCH) or Physical Uplink Shared Channel (PUSCH).

Figure 3:
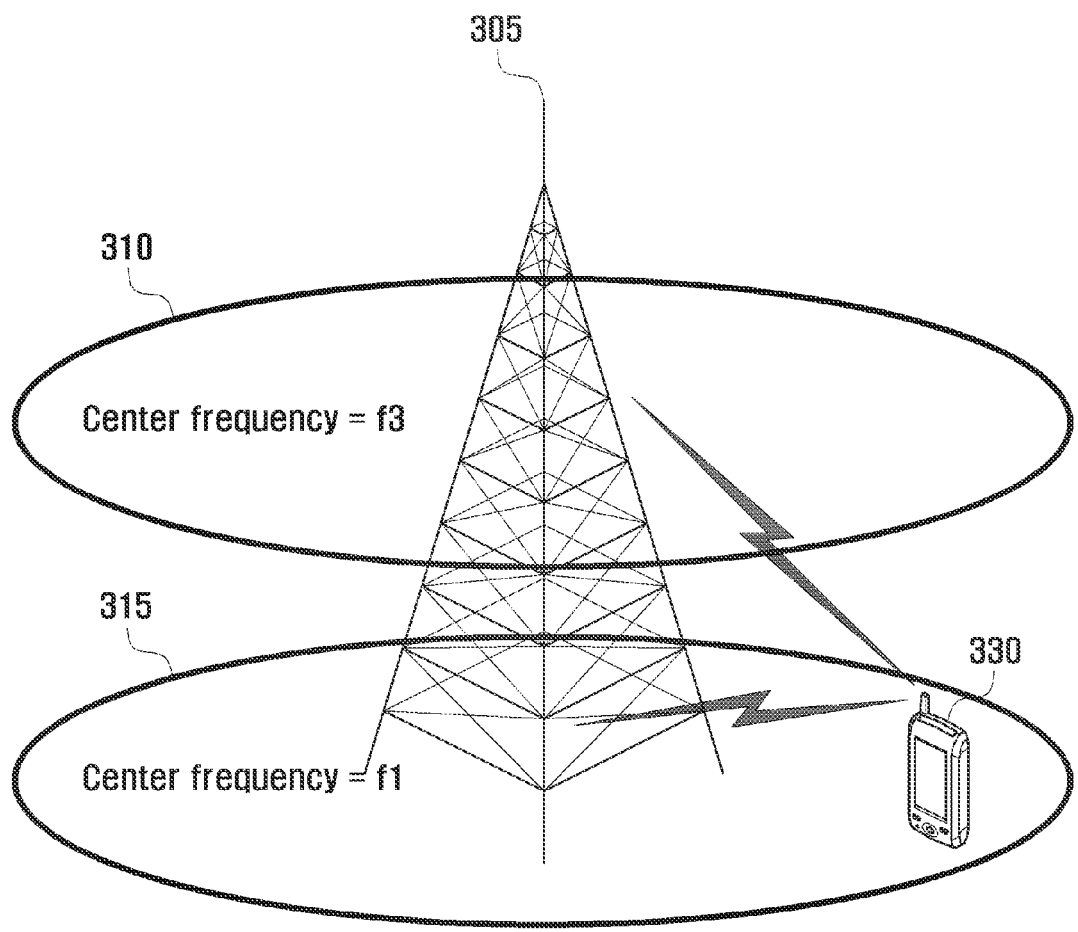
FIG. 3 is a diagram for explaining carrier aggregation at UE.

FIG. 3 is a diagram illustrating an exemplary situation of carrier aggregation in the LTE system to which the present invention is applied.

Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE.

In case that a cell is configured with one downlink carrier and one uplink carrier as a conventional concept, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for explanation convenience, the present invention can be applied to other types of wireless communication systems supporting carrier aggregation.

Figure 4:
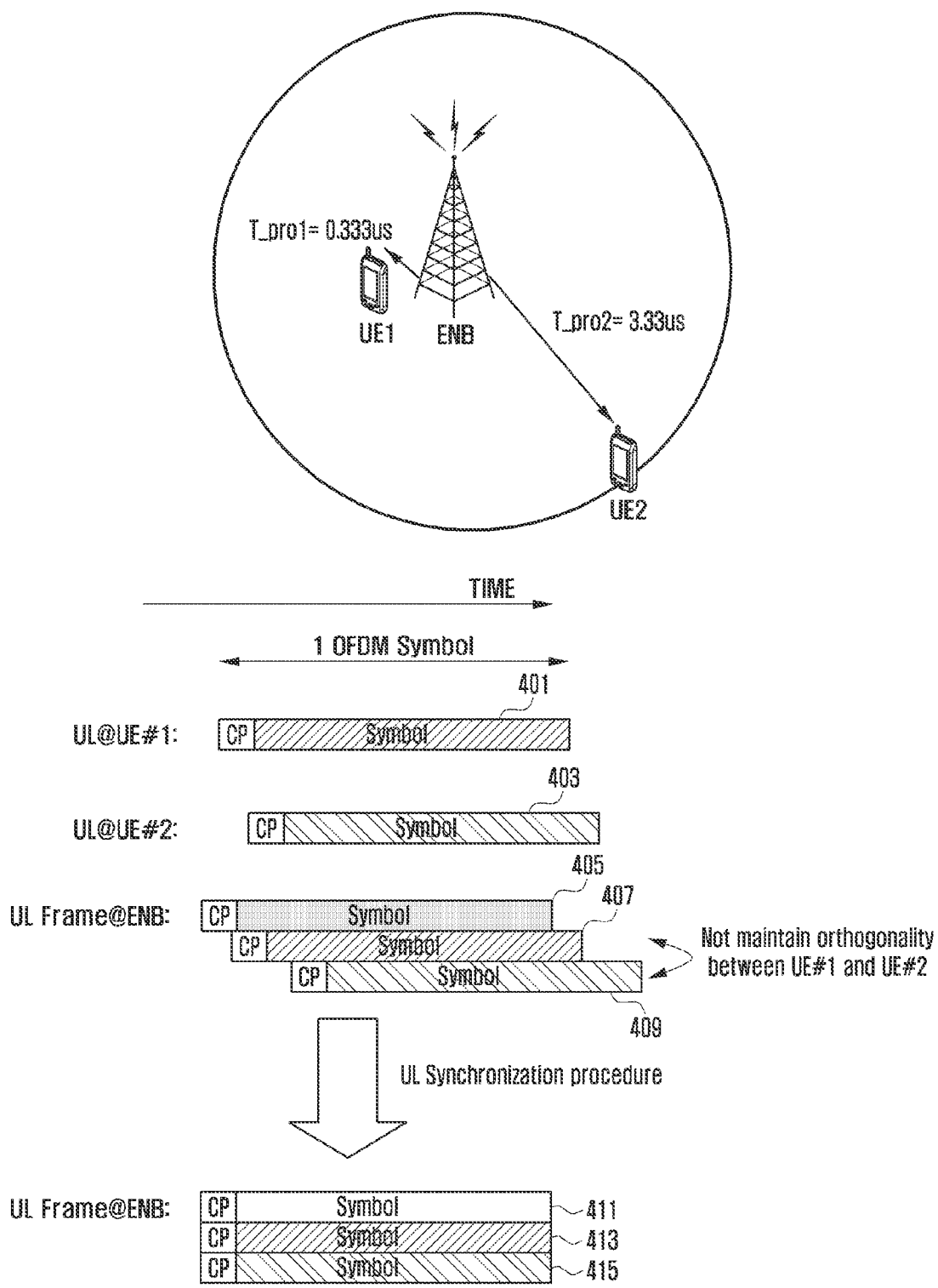
FIG. 4 is a diagram illustrating necessity and role of the uplink timing synchronization procedure.

FIG. 4 is a diagram illustrating a principle of uplink timing synchronization in the OFDM-based 3GPP LTE system to which the present invention is applied.

The UE1 is located near the eNB and the UE2 is located far from the eNB. T_pro1 indicates the first propagation delay time to the UE1, and T_pro2 indicates the second propagation delay to the UE2. The UE1 locates near the eNB as compared to the UE2 and thus has a relatively short propagation delay (T_pro1 is 0.333 us, and T_pro2 is 3.33 us).

When the UE1 and UE2 power on or operate in idle mode within a cell of the eNB, the uplink timing of the UE1, uplink timing of the UE2, and uplink timings of other UEs detected by the eNB in the cell may fail in synchronization.

Reference number 401 denotes uplink OFDM symbol transmission timing of the UE1, and reference number 403 denotes uplink OFDM symbol transmission timing of the UE2. By taking notice of the uplink transmission propagation delays of the UE1 and UE2, the eNB may receive the uplink OFDM symbols at the timings as denoted by reference numbers 405, 407 and 409. The UE1's uplink symbol transmitted at the timing 401 is received by the eNB at the timing 407 with propagation delay while the UE2's uplink symbol transmitted at the timing 403 is received by the eNB at the timing 409 with propagation delay.

In FIG. 4, since the timings 407 and 409 precede the synchronization between the uplink transmission timings of the UE1 and UE2, the uplink OFDM symbol reception and decoding start timing 405 of the eNB, the UE1's uplink OFDM symbol reception timing 407, and the UE2's uplink OFDM symbol reception timing 409 are different among each other. In this case, the uplink symbols transmitted by the UE1 and UE2 are not orthogonal so as to interfere to each other and, as a consequence, the eNB is likely to fail decoding the uplink symbols transmitted, at the timing 401 and 403, by the UE1 and UE2 due to the interference and the mismatch between the uplink symbol reception timings 407 and 409.

Uplink timing synchronization is a procedure for acquiring the eNB's uplink symbol reception timings with the UE1 and UE2 and, if the uplink timing synchronization procedure completes, it is possible to acquire the synchronization among the eNB's uplink OFDM symbol reception and decoding start timing, UE1's uplink OFDM symbol reception timing, and UE2's uplink OFDM symbol reception timing as denoted by reference numbers 411, 413, and 415. In the uplink timing synchronization procedure, the eNB transmits Timing Advance (hereinafter, referred to as TA) information to the UEs to notify of the timing adjustment amount.

The eNB can transmit the TA information in the Timing Advance Commence MAC Control Element (TAC MAC CE) or in the Random Access Response (RAR) message in response to the random access preamble transmitted by the UE for initial access.

The UE can adjust the uplink transmission timing based on the TA information. The UE starts a time alignment timer (timeAlignmentTimer or TAT) upon receipt of TA information, restarts the TAT in response to additional TA reception, and invalidates the TA upon expiry of the TA to stop uplink communication with the corresponding eNB. By acquiring the synchronization among the transmission timings as described above, it is possible to maintain the orthogonality between the uplink symbols of the UE1 and UE2 such that the eNB can decode the uplink symbols from the UE1 and UE2 at the timings 401 and 403 successfully.

Figure 5:
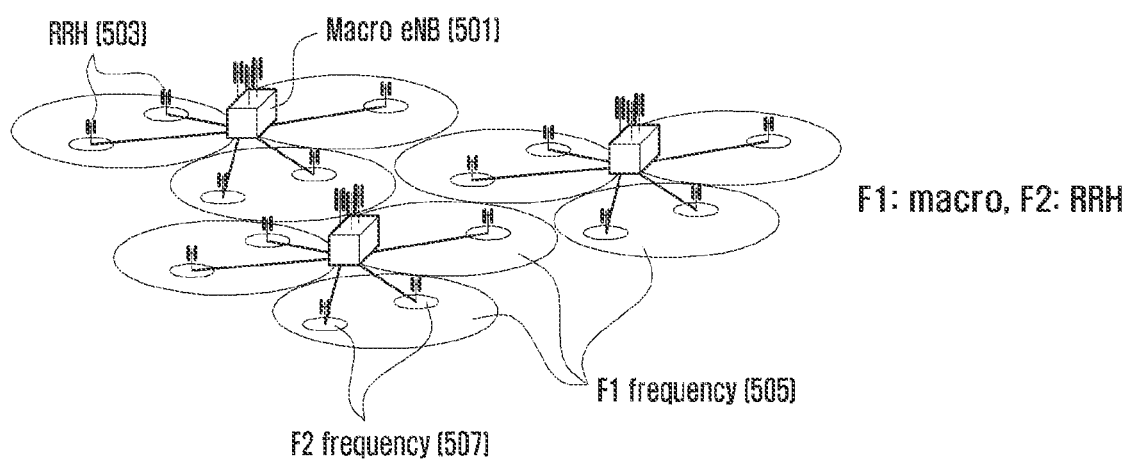
FIG. 5 is a diagram for explaining the case where the devices' positions of the primary and secondary carriers differ from each other when using the carrier aggregation.

FIG. 5 is a diagram illustrating an exemplary network environment having the network entities operating on the primary and secondary carriers at different locations in the system according to an embodiment of the present invention supporting carrier aggregation.

In FIG. 5, the Remote Radio Heads (RRHs) 503 operating on frequency band F2 507 are deployed around the macro eNB 501 using frequency band F1 505. If the UE is connected to both the macro eNB and RRH and located near the RRH and if the UE transmits signal via the RRH, the signal can reach the RRH at an appropriate timing even when there is a little delay due to the short distance, however, the signal transmitted to the macro eNB fails reaching the macro eNB at appropriate timing due to the long distance. In order to overcome this problem, it is necessary for the UE operating with aggregated carriers to synchronize multiple uplink transmission timings. There is therefore a need of a method for operating TATs associated with the plural uplink timings.

For this purpose, the present invention proposes a method for an eNB to categorize the carriers having similar uplink timings into a group. This technique is referred to as Timing Advance Group (hereinafter, referred to as TAG).

In an exemplary case that one PCell (or primary cell) and three SCells A, B and C (or secondary cells) exist, if the PCell and the SCell A have similar uplink timings, they can be categorized into group 1 while the SCell B and SCell C are categorized into group 2. In this case, the eNB transmits the TA information to the group 1 in the TAC MAC CE or RAR to command uplink timing adjustment such that the UE adjusts uplink timings of both the PCell and SCell A based on the information carried in the TAC MAC CE.

Upon receipt of the TA information, the UE also starts TAT of group 1. The TAT is the timer indicating the validity of the TA information and, only when the TAT is running, it is possible to transmit uplink data on the carrier belonging to the group 1 (i.e. PCell and SCell A). Once the TAT expires, the TA information is valid no longer such that the UE cannot transmit data on the corresponding carrier until new TA information is received from the eNB.

The TAT of the group including the PCell like group 1, i.e. PCell TAG, is referred to as PTAG TAT, and the TAT of the group including no PCell like group 2 is referred to as STAG TAT.

Figure 6:
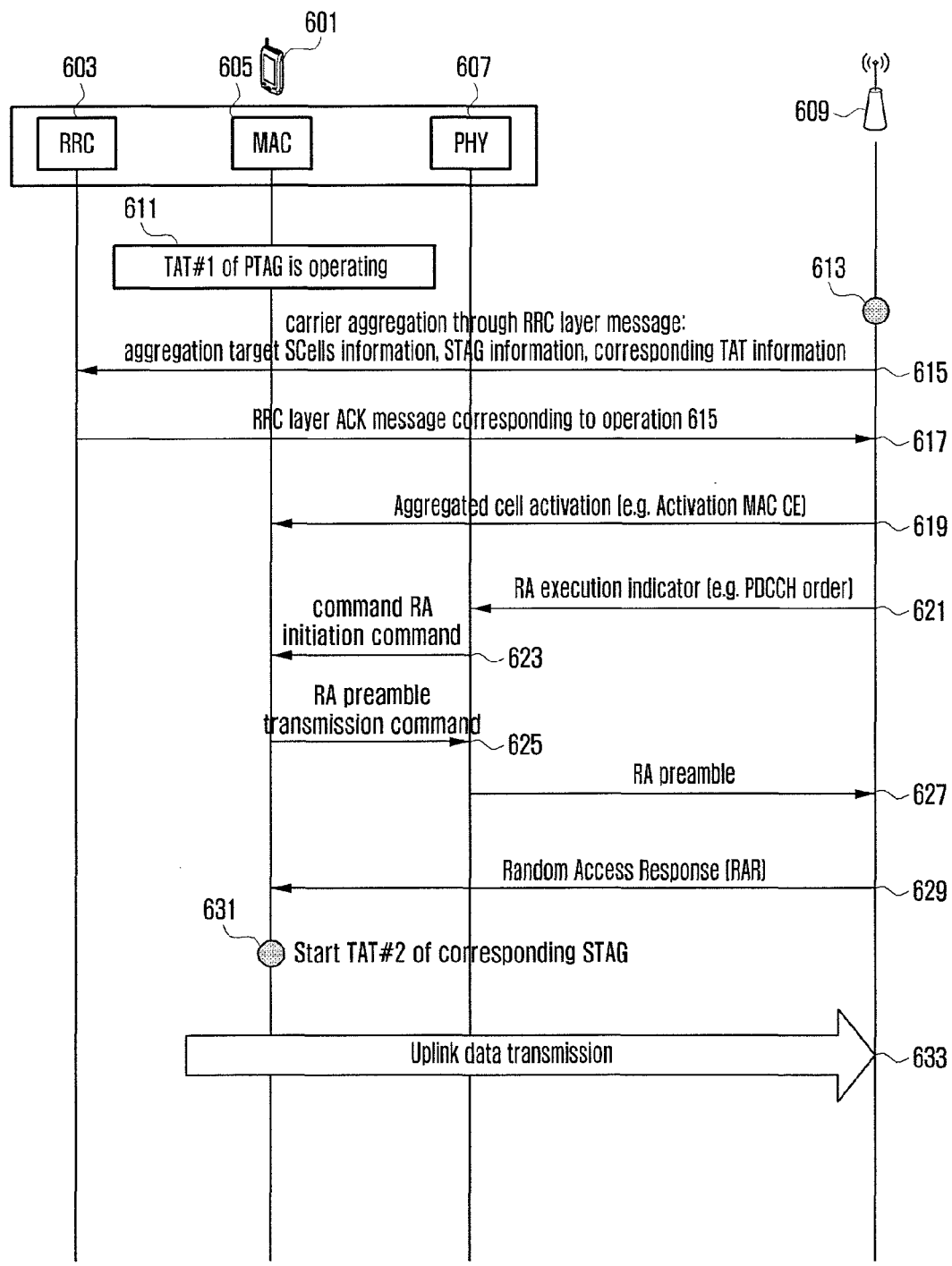
FIG. 6 is a signal flow diagram illustrating a procedure of activating an SCell and adjusting TA between and eNB and a UE for uplink data transmission.

FIG. 6 is a signal flow diagram illustrating a procedure of activating an SCell and adjusting TA between and eNB and a UE for uplink data transmission.

In FIG. 6, the UE 601 is in the state of being connected to the eNB 609 or having only the PCell and the TAT of the PTAG including the PCell, i.e. TAT#1 in the drawing, is running at operation 611. Afterward, the eNB determines to configure carrier aggregation to the UE based on the knowledge that the UE 601 supports carrier aggregation at operation 613.

Accordingly, the eNB sends the UE a carrier aggregation configuration control message for aggregating a plurality of carriers using a RRC layer 603 message at operation 615. The carrier aggregation configuration control message is an RRC layer message including information on the SCells aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 617. The acknowledgement message may be an RRC Connection Reconfiguration Complete (RRCConnectionReconfigurationComplete) message.

In order to activate the configured SCell, an Activation/deactivation MAC CE message (i.e. carrier activation message) is transmitted to notify the UE of activation/deactivation of a certain SCell at operation 619.

Although the SCell(s) is activated with the receipt of the activation/deactivation MAC CE, if the UL synchronization is not acquired (i.e. if the TAT of the corresponding TAG is not running), it is necessary to acquire uplink timing synchronization. In order to accomplish this, the eNB transmits a Physical Downlink Control Channel (PDCCH) order to command the UE to transmit a Random Access Preamble through a specific cell at operation 621.

Upon receipt of this, the PHY layer of the UE instructs the MAC layer to start random access procedure at operation 623. Then the MAC layer of the UE instructs the PHY layer to transmit the Random Access Preamble at operation 625, and the PHY layer of the UE transmits the Random Access Preamble to the eNB through a specific cell at operation 627.

Upon receipt of this, the eNB determines the adjustment amount of the transmission timing of the UE according to the time when the preamble has arrived and sends the UE a Random Access Response (RAR) including the timing advance (TA) information at operation 629.

Upon receipt of this, the UE adjusts the uplink timing of the TAG indicated by the RAR based on the TA information contained in the RAR and starts uplink data transmission. The UE also starts the TAT of the corresponding STAG, i.e. TAT#2 in the drawing, at operation 631. While the TAT of the corresponding TAG is running, the uplink data transmission is possible through the cells belonging to the corresponding TAG at operation 633.

Figure 7:
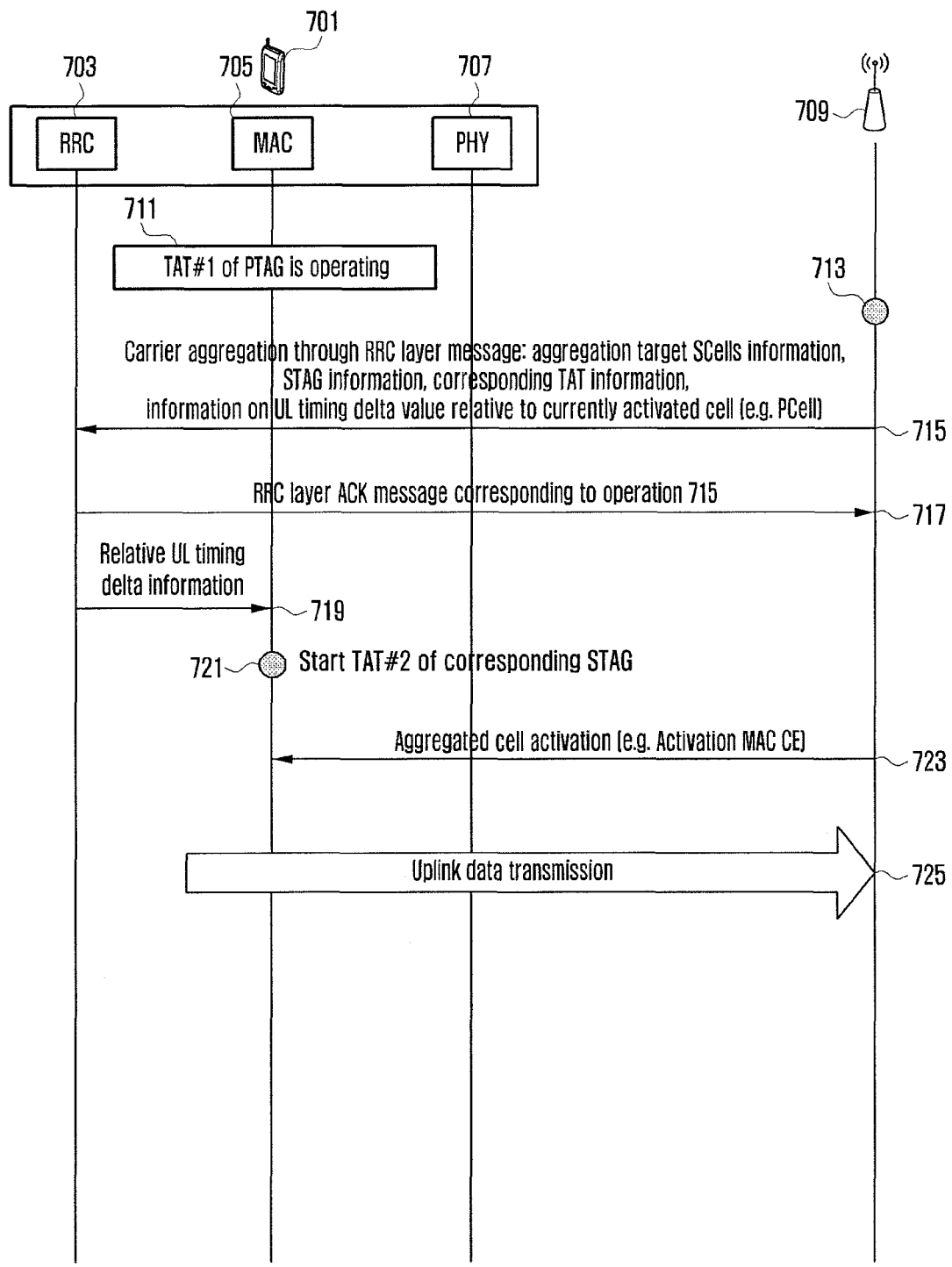
FIG. 7 is a signal flow diagram illustrating a method for reducing uplink transmission delay caused by adjustment of plural timings for use in carrier aggregation according to embodiment 1 of the present invention.

FIG. 7 is a signal flow diagram illustrating a method for reducing uplink transmission delay caused by adjustment of plural timings for use in carrier aggregation according to embodiment 1 of the present invention.

In the embodiment 1, the UE 701 is in the state of being connected to the eNB 709 or having only the PCell and the TAT of the PTAG including the PCell, i.e. TAT#1 in the drawing, is running at operation 711 as in FIG. 6. The eNB 709 determines to configure carrier aggregation to the UE 701 based on the knowledge that the UE 701 supports carrier aggregation at operation 713.

Accordingly, the eNB sends the UE a carrier aggregation configuration control message for aggregating a plurality of carriers using a RRC layer 703 message at operation 715. The carrier aggregation configuration control message is an RRC layer message including information on the SCells aggregated, STAG information, and TAT value per TAG. In the present invention, the carrier aggregation configuration control message further include the information on the uplink timing delta value relative to the currently activated cell (e.g. PCell) for the SCells to be activated, i.e. the offset values relative to the uplink timing of the currently activated PCell. The RRC layer message may be the RRC Connection Reconfiguration (RRCConnectionReconfiguration) message.

Upon receipt of this, the RRC layer of the UE sends a message for acknowledging the configuration at operation 717. The acknowledgement message may be an RRC Connection Reconfiguration Complete (RRCConnectionReconfigurationComplete) message. The RRC layer of the UE sends the MAC layer the uplink timing information on the TAG including the SCell to be activated at operation 719. The RRC layer of the UE which has received the information on the uplink timing delta value calculates the TA on the SCell using the TA of the PCell and the delta value. The MAC layer of the UE starts the TAT of the corresponding TAG (TAT#2 in the drawing) at operation 721.

Afterward, in order to activate the cells configured at operation 715, the eNB transmits the activation/deactivation MAC CE message (carrier activation message) to the UE to notify of the activation/deactivation of a certain SCell at operation 723. While the TAT of the corresponding TAG is running, it is possible to perform uplink data transmission by adjusting the uplink timing according to the TA of the SCell at operation 725.

Figure 8:
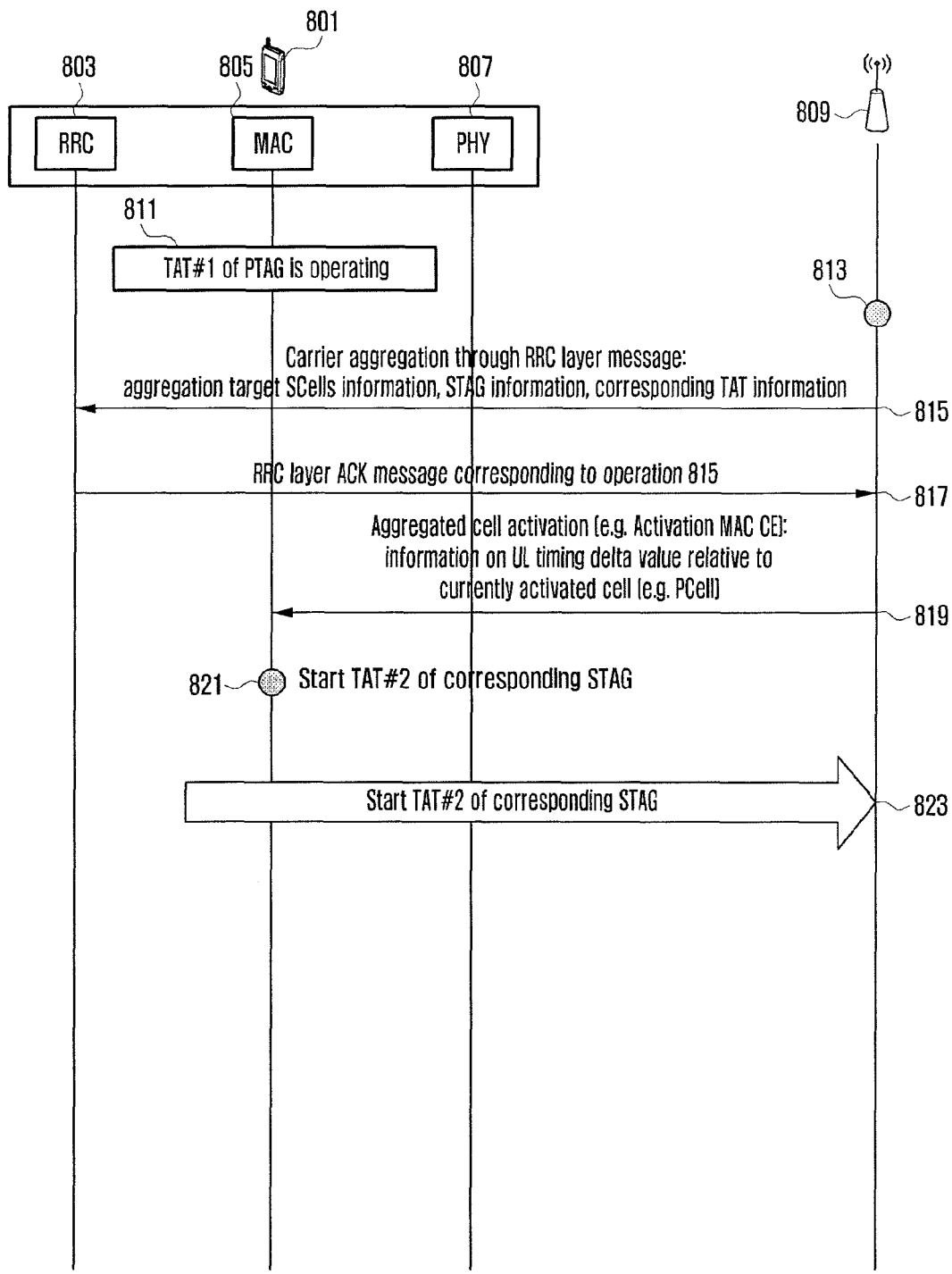
FIG. 8 is a signal flow diagram illustrating a method for reducing uplink transmission delay caused by adjustment of plural timings for use in carrier aggregation according to embodiment 2 of the present invention.

FIG. 8 is a signal flow diagram illustrating a method for reducing uplink transmission delay caused by adjustment of plural timings for use in carrier aggregation according to embodiment 2 of the present invention.

In the embodiment 2, the UE 801 is in the state of being connected to the eNB 709 or having only the PCell and the TAT of the PTAG including the PCell, i.e. TAT#1 in the drawing, is running at operation 811 as in FIG. 6. The eNB 809 determines to configure carrier aggregation to the UE 801 based on the knowledge that the UE 801 supports carrier aggregation at operation 813.

Accordingly, the eNB sends the UE a carrier aggregation configuration message for aggregating a plurality of carriers using a message of the RRC layer 803 at operation 815. The RRC layer message includes the information on the SCells to be aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 817. The acknowledgement message may be an RRC Connection Reconfiguration Complete (RRCConnectionReconfigurationComplete) message.

Afterward, in order to activate the cells configured at operation 815, the eNB transmits the activation/deactivation MAC CE message (carrier activation message) to the UE to notify of the activation/deactivation of a certain SCell at operation 819. The activation/deactivation MAC CE includes the uplink timing delta values of the cells to be activated that are relative to the currently activated cell (e.g. PCell), i.e. information of the offsets relative to the uplink timing of the currently activated PCell. Upon receipt of this, the UE may adjust the uplink timing of the corresponding TAG without extra process of receiving PDCCH order, transmitting preamble, and receiving RAR at operation 821 and transmit uplink data at operation 823.

Figure 9:
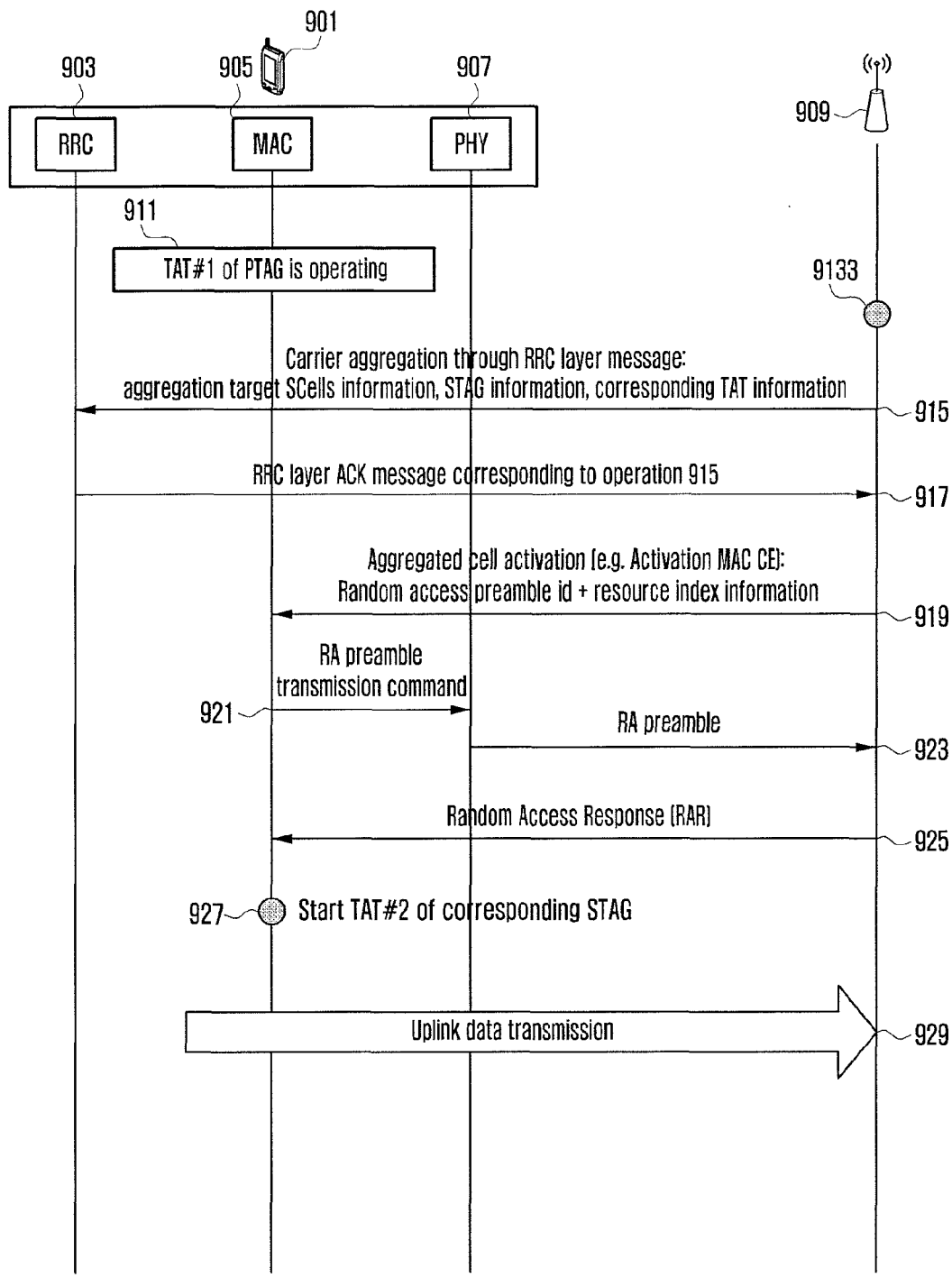
FIG. 9 is a signal flow diagram illustrating a method for reducing uplink transmission delay caused by adjustment of plural timings for use in carrier aggregation according to embodiment 3 of the present invention.

FIG. 9 is a signal flow diagram illustrating a method for reducing uplink transmission delay caused by adjustment of plural timings for use in carrier aggregation according to embodiment 3 of the present invention.

In the embodiment 3, the UE 901 is in the state of being connected to the eNB 909 or having only the PCell and the TAT of the PTAG including the PCell, i.e. TAT#1 in the drawing, is running at operation 911 as in FIG. 6. The eNB 909 determines to configure carrier aggregation to the UE 901 based on the knowledge that the UE 901 supports carrier aggregation at operation 913.

Accordingly, the eNB sends the UE a carrier aggregation configuration message for aggregating a plurality of carriers using a message of the RRC layer 903 at operation 915. The RRC layer message includes the information on the SCells to be aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 917. The acknowledgement message may be an RRC Connection Reconfiguration Complete (RRCConnectionReconfigurationComplete) message.

Afterward, in order to activate the cells configured at operation 915, the eNB transmits the activation/deactivation MAC CE message (carrier activation message) to the UE to notify of the activation/deactivation of a certain SCell at operation 919.

At this time, the activation/deactivation MAC CE includes a Random Access Preamble identifier and transmission position (resource index) for transmission of the Random Access Preamble through the corresponding cells to synchronize uplink timings of the cells to be activated. Upon receipt of this, the UE instructs the PHY layer 807 to transmit the Random Access Preamble according to the Random Access Preamble indicator and transmission position (resource index) at operation 921 as in the case of receiving PDCCH order, and the PHY layer transmits the Random Access Preamble to the eNB at operation 923.

Upon receipt of this, the eNB determines the adjustment amount of the transmission timing of the UE based on the preamble arrival time and sends the UE a Random Access Response (RAR) message including the TA information at operation 925.

Upon receipt of this, the UE adjusts the uplink timing of the TAG based on the TA information included in the RAR and, since then, it is possible to transmit uplink data. The UE also starts the TAT of the corresponding STAG, i.e. TAT#2 in the drawing, at operation 927. Afterward, while the TAT of the corresponding TAG is running, it is possible to transmit uplink data through the cells of the corresponding TAG at operation 929.

Figure 10:
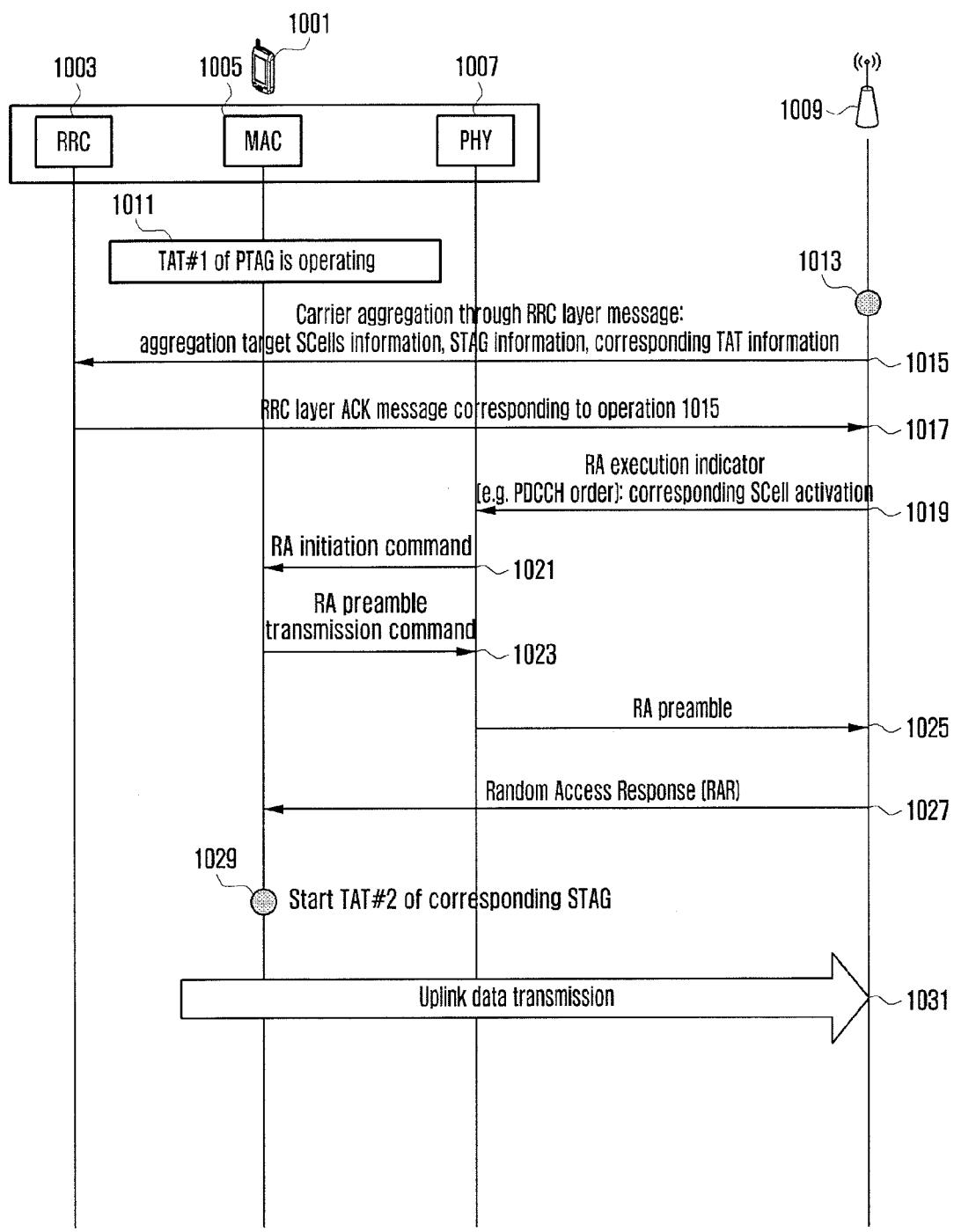
FIG. 10 is a signal flow diagram illustrating a method for reducing uplink transmission delay caused by adjustment of plural timings for use in carrier aggregation according to embodiment 4 of the present invention.

FIG. 10 is a signal flow diagram illustrating a method for reducing uplink transmission delay caused by adjustment of plural timings for use in carrier aggregation according to embodiment 4 of the present invention.

In the embodiment 3, the UE 1001 is in the state of being connected to the eNB 1009 or having only the PCell and the TAT of the PTAG including the PCell, i.e. TAT#1 in the drawing, is running at operation 911 as in FIG. 6. The eNB 1009 determines to configure carrier aggregation to the UE 1001 based on the knowledge that the UE 1001 supports carrier aggregation at operation 1013.

Accordingly, the eNB sends the UE a carrier aggregation configuration message for aggregating a plurality of carriers using a message of the RRC layer 1003 at operation 1015. The RRC layer message includes the information on the SCells to be aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 1017. The acknowledgement message may be an RRC Connection Reconfiguration Complete (RRCConnectionReconfigurationComplete) message.

Afterward, in order to activate the cells configured at operation 1015, the eNB transmits PDCCH order for the SCell that is not activated yet, instead of transmitting the activation/deactivation MAC CE message, to notify the UE implicitly that the corresponding cell has to be activated at operation 1019.

Upon receipt of this, the UE activates the SCell, and the PHY layer of the UE interrupts the MAC layer to start random access procedure to adjust the uplink timing of the TAG at operation 1021. The MAC layer of the UE interrupts the PHY layer to transmit the Random Access Preamble at operation 1023, and the PHY layer of the UE transmits the Random Access Preamble to the eNB through a specific cell at operation 1025.

Upon receipt of this, the eNB determines the adjustment amount of the transmission timing of the UE based on the preamble arrival time and sends the UE a Random Access Response (RAR) message including the TA information at operation 1027.

Upon receipt of this, the UE adjusts the uplink timing of the TAG based on the TA information included in the RAR and, since then, it is possible to transmit uplink data. The UE also starts the TAT of the corresponding STAG, i.e. TAT#2 in the drawing, at operation 1029. Afterward, while the TAT of the corresponding TAG is running, it is possible to transmit uplink data through the cells of the corresponding TAG at operation 1031.

Figure 11:
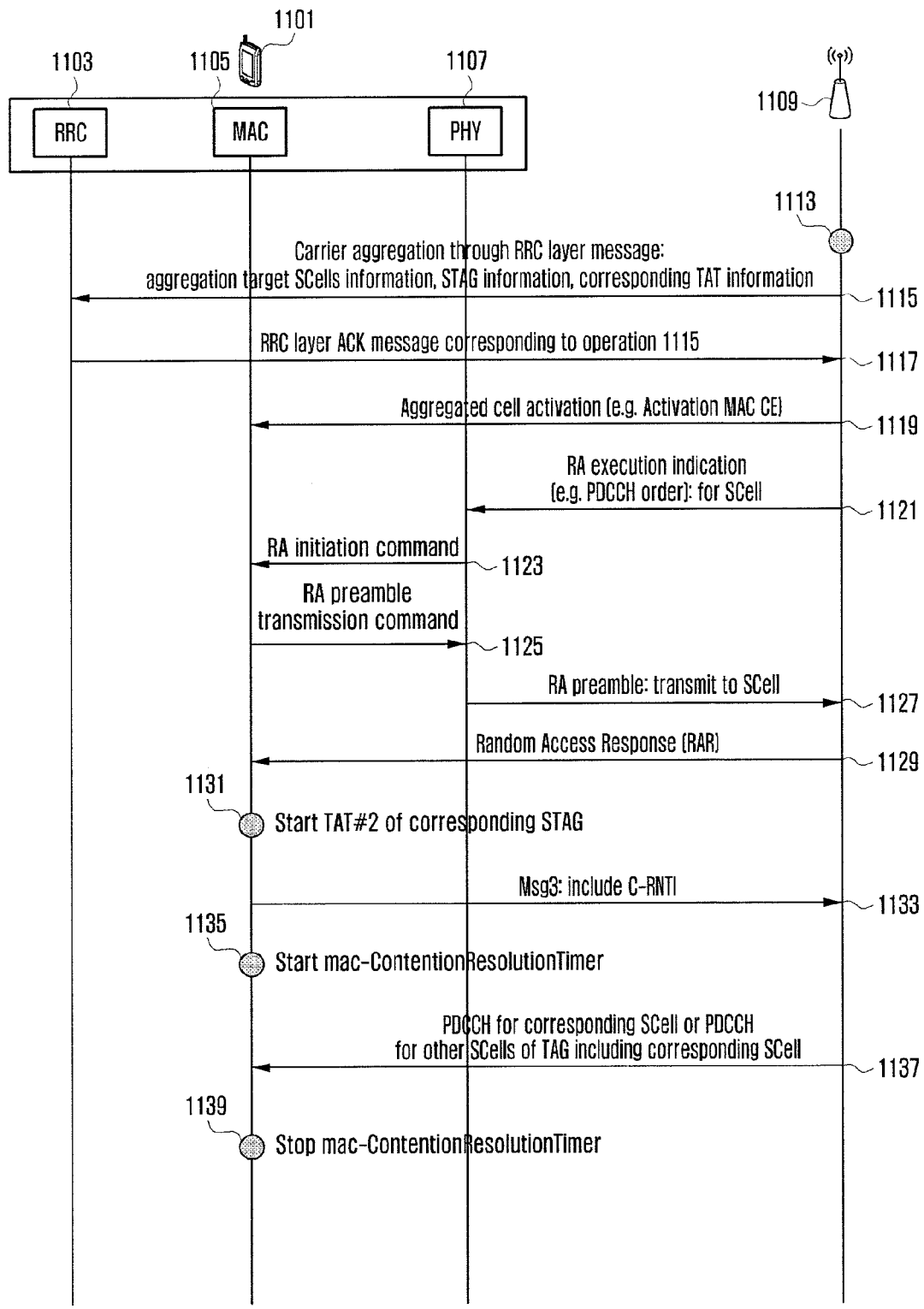
FIG. 11 is a signal flow diagram illustrating a contention resolution procedure of the UE in using carrier aggregation according to an embodiment of the present invention.

FIG. 11 is a signal flow diagram illustrating a contention resolution procedure of the UE in using carrier aggregation according to an embodiment of the present invention.

In this procedure, the eNB 1009 determines to configure carrier aggregation to the UE based on the knowledge that the UE 1001 has the carrier aggregation capability at operation 1113.

The eNB sends the UE a carrier aggregation configuration message using a message of the RRC layer 1103 at operation 1115. The RRC layer message includes the information on the SCells to be aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 1117. The acknowledgement message may be an RRC Connection Reconfiguration Complete (RRCConnectionReconfigurationComplete) message.

Afterward, in order to activate the configured cells, the eNB transmits the activation/deactivation MAC CE message to the UE to notify of the activation/deactivation of a certain SCell at operation 1119.

Although the SCell(s) is activated with the receipt of the activation/deactivation MAC CE, if the UL synchronization is not acquired (i.e. if the TAT of the corresponding TAG is not running), it is necessary to acquire uplink timing synchronization.

In order to accomplish this, the eNB sends the UE the PDCCH order to command the UE to transmit a Random Access Preamble through a specific cell at operation 1121. At this time, the PDCCH order can be transmitted through any of the activated SCells and PCell and, in this embodiment, the SCell is assumed for convenience purpose. Upon receipt of this, the PHY layer of the UE interrupts the MAC layer to start random access procedure at operation 1123. The MAC layer of the UE interrupts the PHY layer to transmit the Random Access Preamble through the corresponding cell (SCell in this embodiment) at operation 1125, and the PHY layer of the UE transmits the Random Access Preamble to the corresponding cell (SCell in this embodiment) at operation 1127.

Upon receipt of this, the eNB determines the adjustment amount of the transmission timing of the UE according to the time when the preamble has arrived and sends the UE a Random Access Response (RAR) including the timing advance (TA) information at operation 1129.

Upon receipt of this, the UE adjusts the uplink timing of the TAG indicated by the RAR based on the TA information contained in the RAR and, since than it is possible to transmit uplink data. The UE also starts the TAT of the corresponding STAG, i.e. TAT#2 in the drawing, at operation 1131. Afterward, the UE transmits a Msg 3 message according to the information included in the RAR message at operation 1133 and starts a mac-ContentionResolutionTimer for contention resolution at operation 1135. The Msg 3 message includes a UE identifier assigned by the eNB, i.e. Cell-Radio Network Temporary Identifier (C-RNTI). If this is received successfully, the eNB transmits PDCCH for resource allocation to the UE at operation 1137. At this time, if the PDCCH is addressed to the SCell indicated at operation 1121 or one of other SCells of the TAG including the corresponding SCell, the UE assumes that the Msg 3 message transmitted at operation 1133 has been delivered successfully and stops mac-ContentionResolutionTimer at operation 1139.

Figure 12:
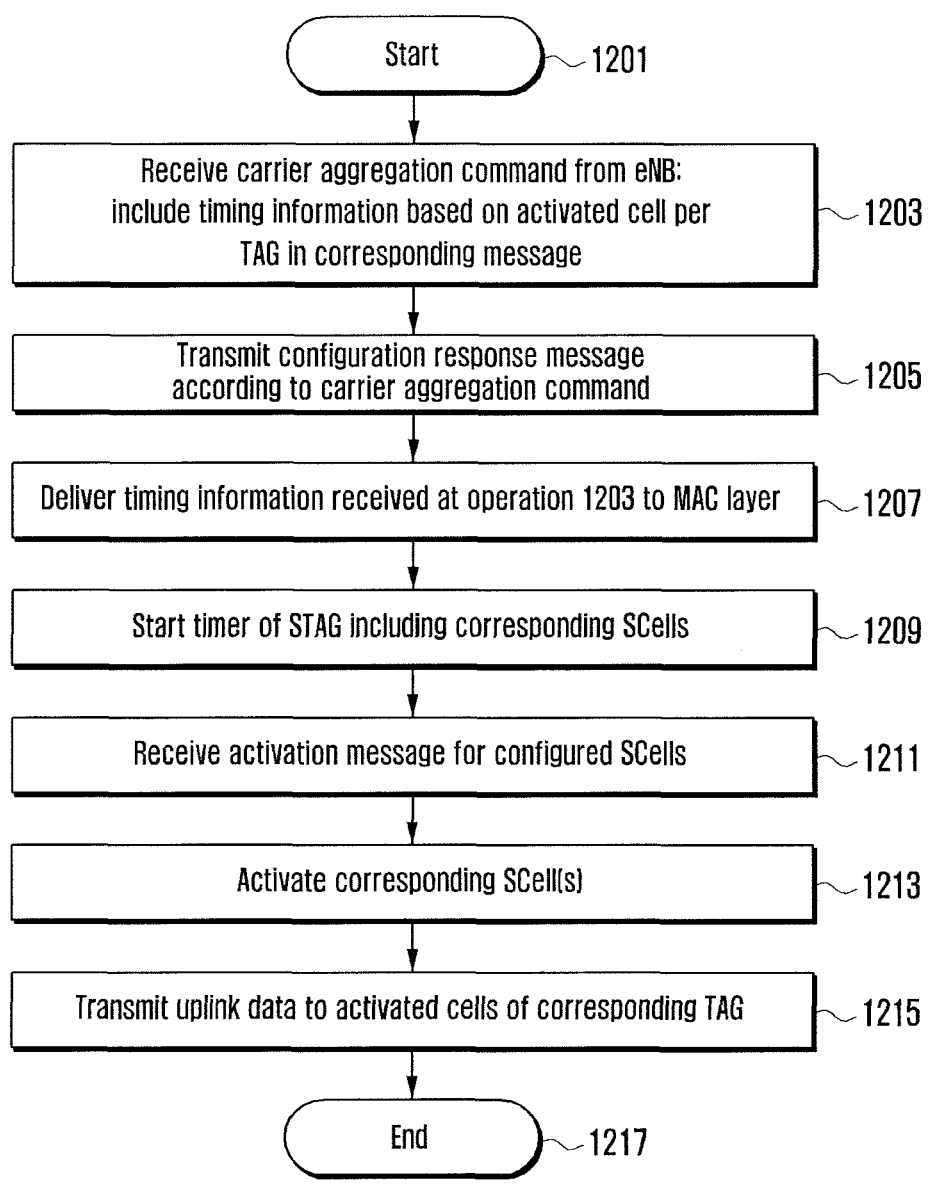
FIG. 12 is a flowchart illustrating the UE procedure according to the embodiment 1 of the present invention.

FIG. 12 is a flowchart illustrating the UE procedure according to the embodiment 1 of the present invention.

In the embodiment 1, the UE receives an RRC layer message for configuring aggregation of a plurality of carriers from the eNB at operation 1203. The RRC layer message includes the information on the SCells to be aggregated, STAG information, and TAT value per TAG. In the present invention, the carrier aggregation configuration control message further include the information on the uplink timing delta value relative to the currently activated cell (e.g. PCell) for the SCells to be activated, i.e. the offset values relative to the uplink timing of the currently activated PCell. The RRC layer message may be the RRC Connection Reconfiguration (RRCConnectionReconfiguration) message.

Upon receipt of this, the RRC layer of the UE sends a message for acknowledging the configuration at operation 1205. The acknowledgement message may be an RRC Connection Reconfiguration Complete (RRCConnectionReconfigurationComplete) message. The RRC layer of the UE sends the MAC layer the uplink timing information on the TAG including the SCell to be activated at operation 1207. The MAC layer of the UE starts the TAT of the corresponding TAG at operation 1209.

Afterward, if the activation/deactivation MAC CE message for activating specific SCells is received from the eNB at operation 1211, the UE activates/deactivates the corresponding SCells at operation 1213 and transmits uplink data through the cells belonging to the corresponding TAG while the TAT of the corresponding TAG is running at operation 1215.

Figure 13:
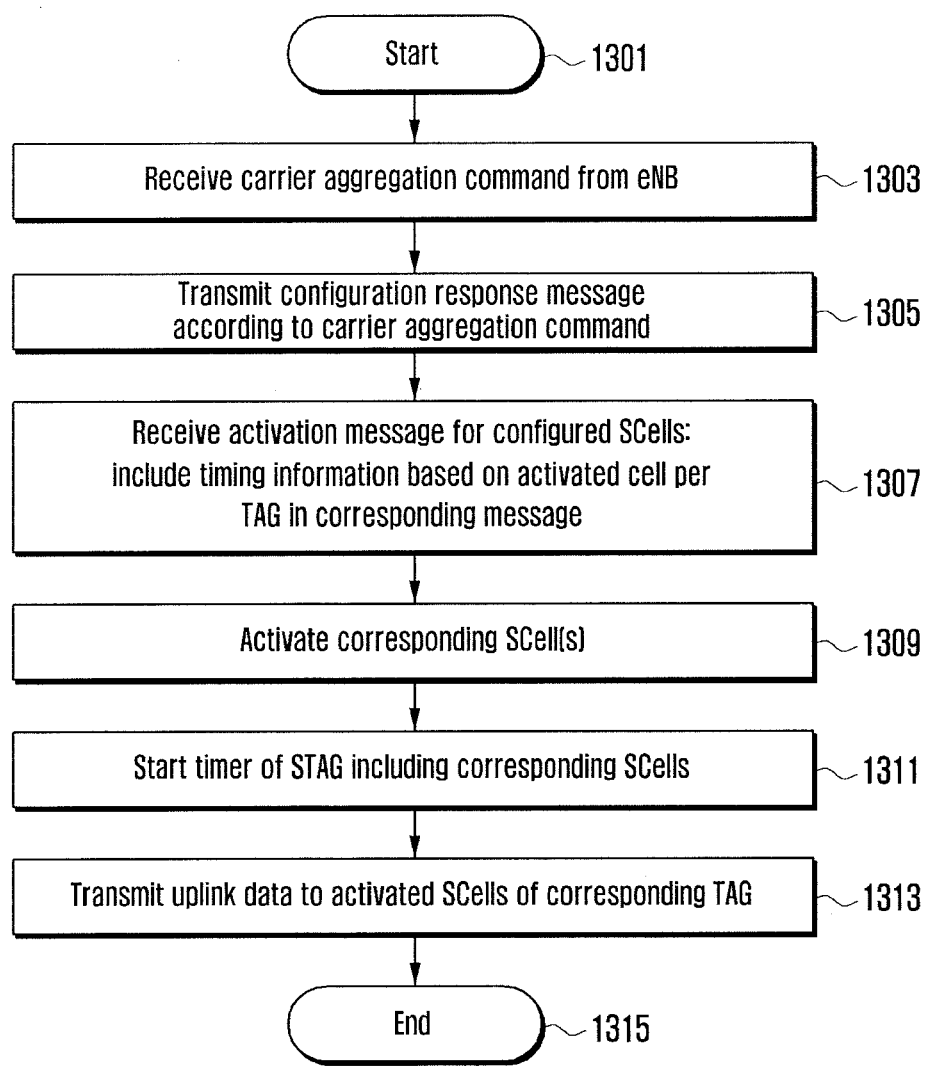
FIG. 13 is a flowchart illustrating the UE procedure according to the embodiment 2 of the present invention.

FIG. 13 is a flowchart illustrating the UE procedure according to the embodiment 2 of the present invention.

In the embodiment 2, the UE receives an RRC layer message for configuring aggregation of a plurality of carriers from the eNB at operation 1303. The RRC layer message includes the information on the SCells to be aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 1307. The acknowledgement message may be an RRC Connection Reconfiguration Complete (RRCConnectionReconfigurationComplete) message.

Afterward, the UE receives the activation/deactivation MAC CE message for activating specific SCells from the eNB at operation 1307. The activation/deactivation MAC CE includes the uplink timing delta values of the cells to be activated that are relative to the currently activated cell (e.g. PCell).

Upon receipt of this, the UE may activate the cells indicated in the activation/deactivation MAC CE at operation 1309, starts the TAT of the TAG including the corresponding SCells at operation 1311, and transmits uplink data without extra PDCCH order reception, preamble transmission, and RAR reception processes at operation 1313.

Figure 14:
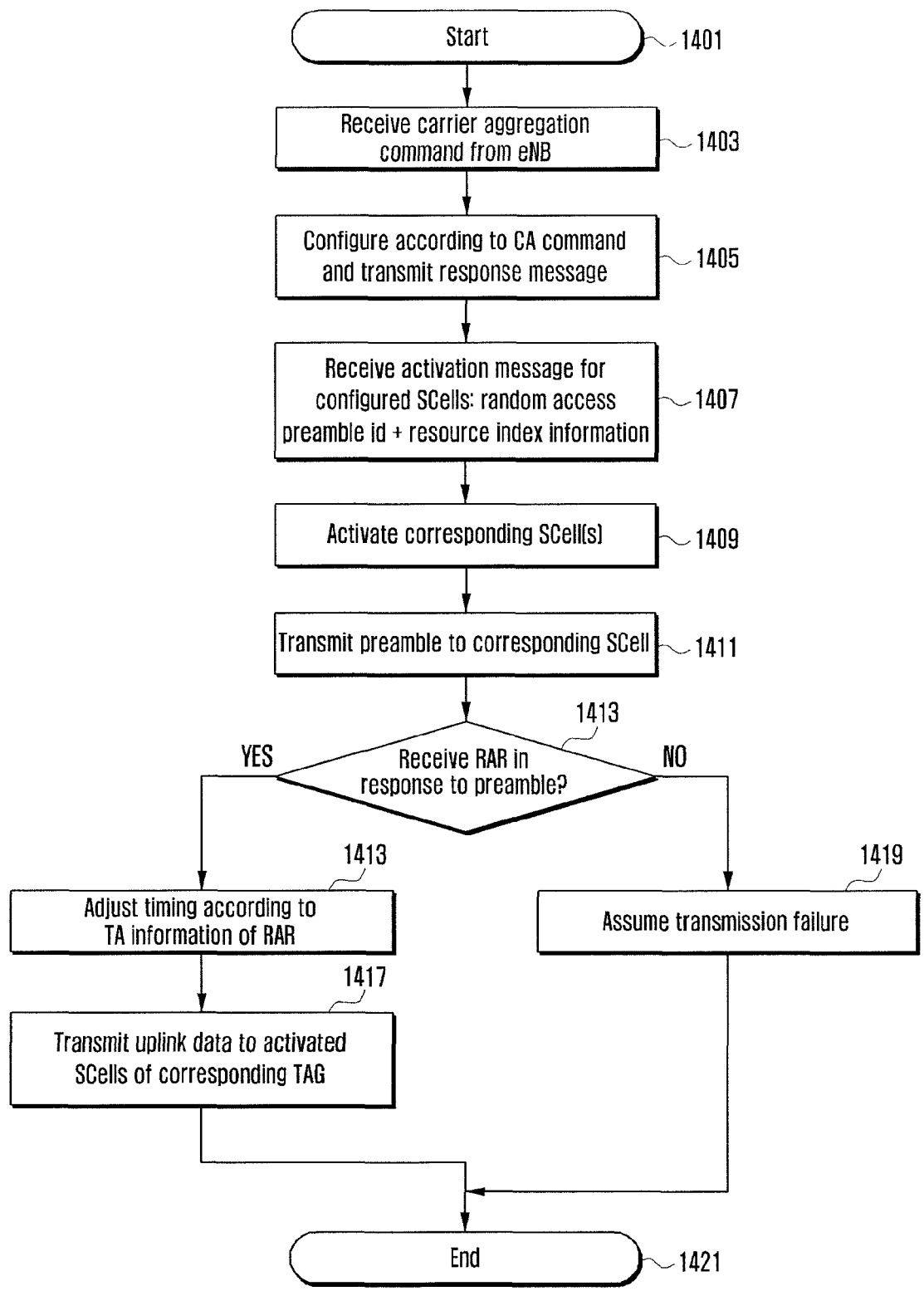
FIG. 14 is a flowchart illustrating the UE procedure according to the embodiment 3 of the present invention.

FIG. 14 is a flowchart illustrating the UE procedure according to the embodiment 3 of the present invention.

In the embodiment 3, the UE receives an RRC layer message for configuring aggregation of a plurality of carriers from the eNB at operation 1403. The RRC layer message includes the information on the SCells to be aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 1405. The acknowledgement message may be an RRC Connection Reconfiguration Complete (RRCConnectionReconfigurationComplete) message.

Afterward, the UE receives the activation/deactivation MAC CE message for activating specific SCells from the eNB at operation 1407. At this time, the activation/deactivation MAC CE includes a Random Access Preamble identifier and transmission position (resource index) for transmission of the Random Access Preamble through the corresponding cells to synchronize uplink timings of the cells to be activated.

Upon receipt of this, the UE activates the corresponding SCells at operation 1409 and sends the eNB the Random Access Preamble according to the Random Access Preamble indicator and transmission position (resource index) at operation 1411 as in the case of receiving PDCCH order.

Afterward, if the RAR is received in response to the Random Access Preamble at operation 1413, the UE adjusts the uplink timing according to the TA information included in the RAR and starts the TAT of the corresponding STAG, i.e. TAT#2 in the drawing, at operation 1415. Since then, it is possible to transmit uplink data at operation 1417.

Otherwise if no RAR is received in response to the Random Access Preamble at operation 1413, the UE assumes failure of Random Access Preamble transmission and ends the operation at operation 1419.

Figure 15:
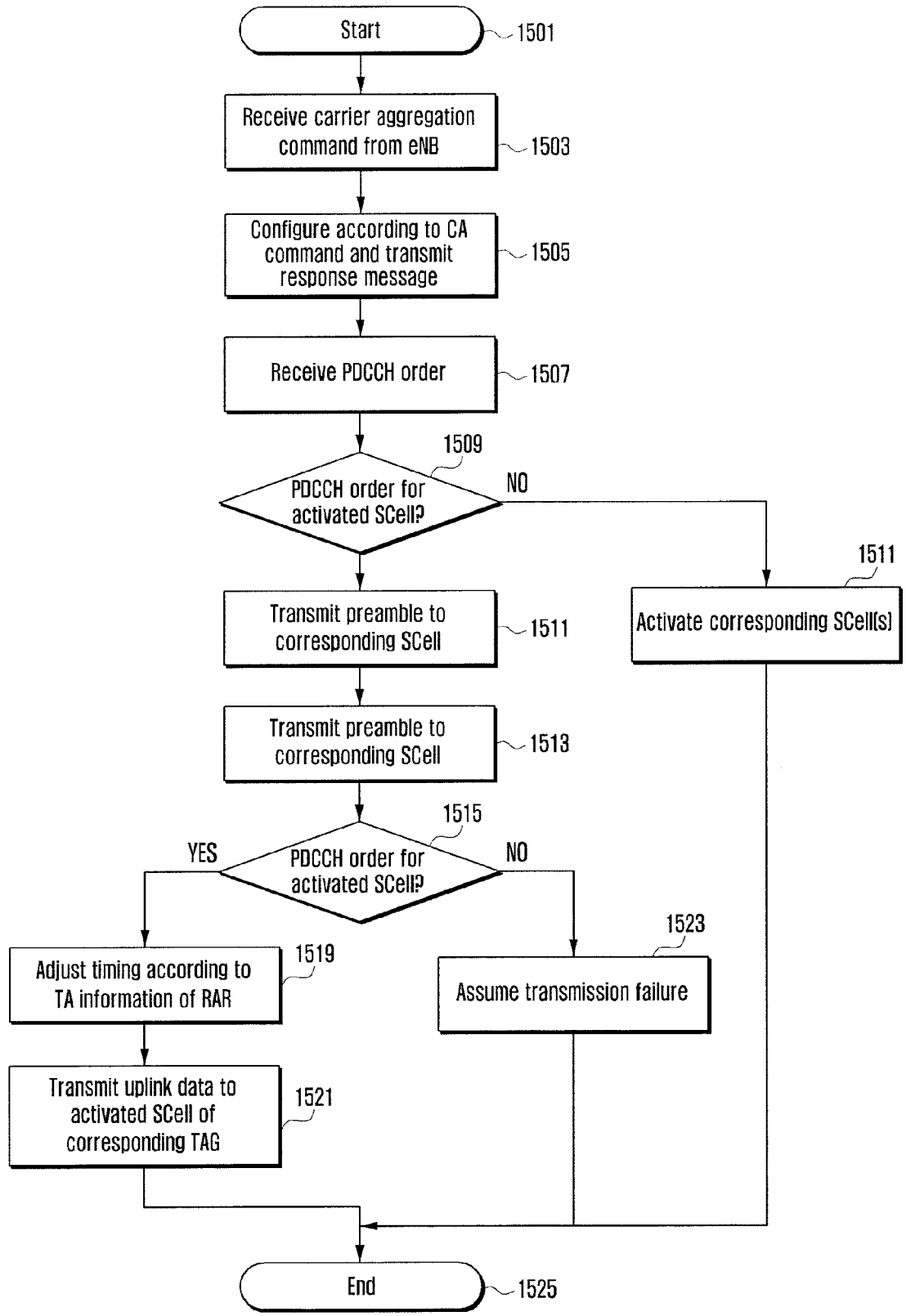
FIG. 15 is a flowchart illustrating the UE procedure according to the embodiment 4 of the present invention.

FIG. 15 is a flowchart illustrating the UE procedure according to the embodiment 4 of the present invention.

In the embodiment 4, the UE receives an RRC layer message for configuring aggregation of a plurality of carriers from the eNB at operation 1503. The RRC layer message includes the information on the SCells to be aggregated, STAG information, and TAT value per TAG. The RRC layer message may be the RRC Connection Reconfiguration (RRCConnectionReconfiguration) message.

Upon receipt of this, the RRC layer of the UE sends a message for acknowledging the configuration at operation 1505. The acknowledgement message may be an RRC Connection Reconfiguration Complete (RRCConnectionReconfigurationComplete) message.

Afterward, the UE receives the PDCCH order from the eNB at operation 1507. If the PDCCH order is of the SCell which has been already activated at operation 1509, the UE transmits the preamble through the corresponding SCell according to the command at operation 1511.

Otherwise if the PDCCH order is of the SCell that is not activated yet at operation 1509, the UE activates the corresponding SCell implicitly although no activation/deactivation MAC CE is received at operation 1513 and transmits the Random Access Preamble through the corresponding SCell according to the PDCCH order at operation 1515.

Afterward, if the RAR is received in response to the Random Access Preamble at operation 1517, the UE adjusts the uplink timing according to the TA information included in the RAR and starts the TAT of the corresponding STAG, i.e. TAT#2 in the drawing, at operation 1519. Since then, the UE may transmit the uplink data through the corresponding TAG at operation 1521.

Otherwise if no RAR is received in response to the Random Access Preamble at operation 1517, the UE assumes the failure of Random Access Preamble transmission and ends the procedure at operation 1523.

Figure 16:
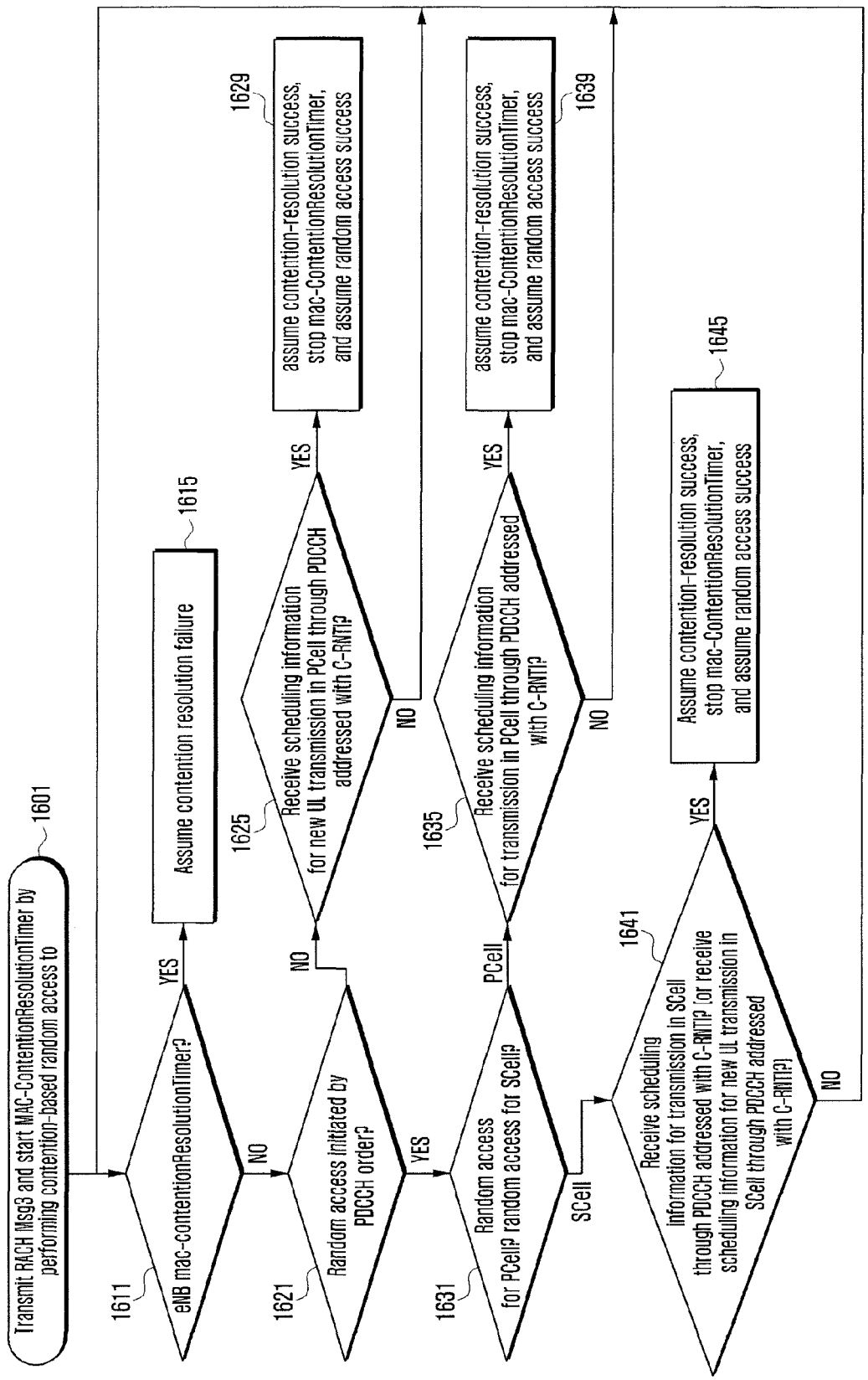
FIG. 16 is a flowchart illustrating the UE procedure for contention resolution proposed in the present invention.

FIG. 16 is a flowchart illustrating the UE procedure for contention resolution proposed in the present invention.

The UE performs the contention-based random access to transmit RACH Msg3 and starts the mac-ContentionResolutionTimer at operation 1601 and, if the mac-ContentionResolutionTimer ends at operation 1611, assumes contention resolution failure at operation 1615.

Otherwise if the mac-ContentionResolutionTimer does not ends at operation 1611, the UE determines whether the random access is initiated by PDCCH order at operation 1621.

If the random access is not initiated by the PDCCH order and if the scheduling information for new uplink transmission in PCell through PDCCH addressed with C-RNTI as the UE identifier at operation 1625, the UE assumes the success of contention resolution so as to stop mac-ContentionResolutionTimer and assumes that the random access successful at operation 1629. Otherwise if the PDCCH addressed with C-RNTI as the UE identifier is not received, the UE waits until mac-ContentionResolutionTimer expires.

If the random access is initiated by the PDCCH order at operation 1621, the UE determines whether the random access is initiated for PCell or SCell at operation 1631.

If the random access is initiated for the PCell and if the scheduling information for PCell transmission is received through PDCCH addressed with C-RNTI as the UE identifier at operation 1635, the UE assumes that the contention resolution is successful, stops the mac-ContentionResolutionTimer, and assumes that the random access is successful at operation 1639.

If the random access is initiated for the SCell and if the scheduling information for SCell transmission is received through the PDCCH addressed with the C-RNTI as the UE identifier or if the scheduling information for new uplink transmission in the SCell is received through the PDCCH addressed with C-RNTI at operation 1641, the UE assumes that the contention resolution is successful, stops mac-ContentionResolutionTimer, and assumes that the random access is successful at operation 1645. Otherwise, the UE waits until the mac-ContentionResolutionTimer expires.

Figure 17:
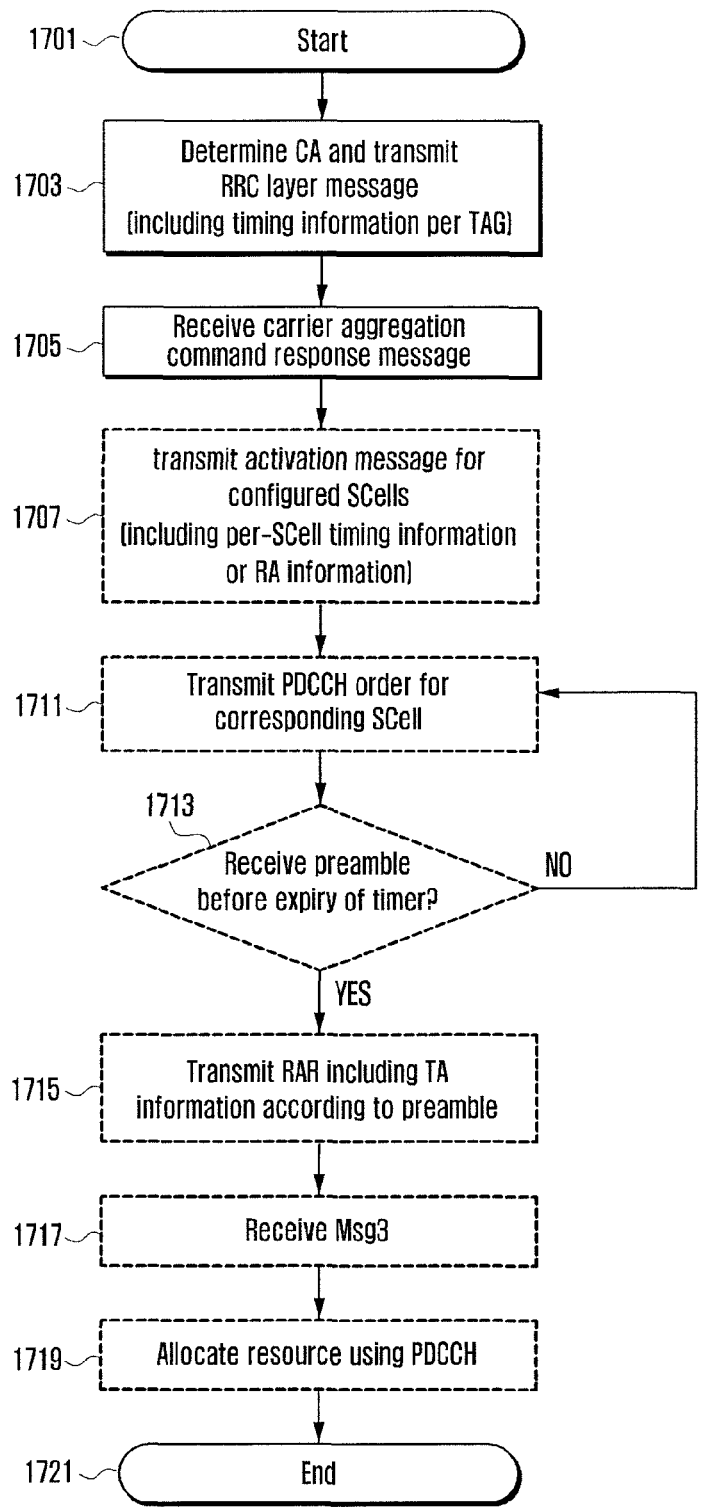
FIG. 17 is a flowchart illustrating the eNB procedure when using the method proposed in the present invention.

FIG. 17 is a flowchart illustrating the eNB procedure when using the method proposed in the present invention.

In the present invention, the eNB determines to configure the carrier aggregation to the UE based on the assumption that the UE has the carrier aggregation capability and sends the UE a carrier aggregation configuration message using the RRC layer message at operation 1703. The RRC layer message includes the information on the SCells to be aggregated, STAG information, and TAT value per TAG. According to an embodiment, the RRC layer message may further comprise timing information per TAG based on the currently synchronized cell. The RRC layer message may be the RRC Connection Reconfiguration (RRCConnectionReconfiguration) message.

Afterward, the RRC layer receives a message for acknowledging the configuration from the UE at operation 1705. The acknowledgement message may be an RRC Connection Reconfiguration Complete (RRCConnectionReconfigurationComplete) message.

According to an embodiment, in order to activate the configured SCell, the eNB sends the activation/deactivation MAC CE message on the MAC layer to notify the UE of the activation/deactivation of a specific SCell at operation 1707. According to an embodiment, the activation/deactivation MAC CE message may include per-cell timing information based on the currently synchronized cell and random access information (preamble index, resource index, etc.). According to various embodiments, the activation/deactivation MAC CE message transmission may be omitted.

Although the SCell(s) is activated with the receipt of the activation/deactivation MAC CE, if the UL synchronization is not acquired (i.e. if the TAT of the corresponding TAG is not running), it is necessary to acquire uplink timing synchronization according to an embodiment. In order to accomplish this, the eNB sends the UE the PDCCH order to command the UE to transmit a Random Access Preamble through a specific cell at operation 1711. The PDCCH order may be omitted according to above-described various embodiments.

Afterward, if the preamble is received in response to the PDCCH order at operation 1713, the eNB configures the TA information according to the preamble reception timing and sends the UE an RAR message at operation 1715. This process also may be omitted according to above-described various embodiments.

If the Msg3 message is received from the UE, the eNB allocates resource to the UE using PDCCH according to the information (C-RNTI, etc.) included in the Msg3 at operation 1719.

Figure 18:
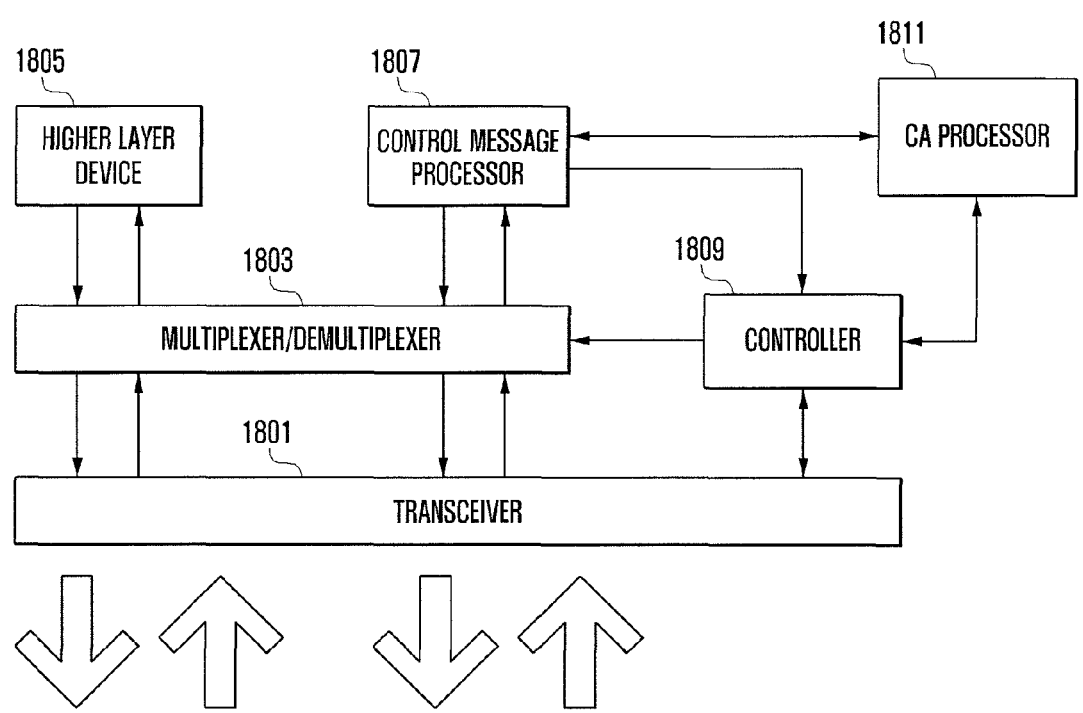
FIG. 18 is a block diagram illustrating a configuration of the UE according to an embodiment of the present invention.

FIG. 18 is a block diagram illustrating a configuration of the UE according to an embodiment of the present invention.

The UE transmits/receives data generated by a higher layer device 1805 and control messages generated by a control message processor 1807. When transmitting control signal and/or data to the eNB, the UE multiplexes the control signal and/or data by means of the multiplexer/demultiplexer 1803 under the control of the controller 1809. When receiving control signal and/or data from the eNB, the UE receives the physical signal by means of the transceiver 1801, demultiplexes the received signal by means of the multiplexer/demultiplexer 1803, and delivers the demultiplexed signal to the corresponding higher layer device 1805 or control message processor 1807.

If the UE receives an RRC layer message including carrier aggregation configuration command (1807) from the eNB, the carrier aggregation processor 1811 configures SCells of the UE according to the content of the corresponding message. In the case that the RRC layer message includes the timing information on the TAG including the SCells, the carrier aggregation processor 1811 notifies the controller 1809 of the uplink timing of the corresponding information to adjust the uplink timing of the corresponding SCells.

Afterward, the UE transmits an acknowledgement message corresponding to the RRC layer message.

According to an embodiment, if the activation/deactivation MAC CE is received from the eNB, the UE activates the corresponding SCells. According to an embodiment, if the activation/deactivation MAC CE includes timing information on the SCells to be activated additionally, the UE adjusts the uplink timing of the corresponding SCells. According to an embodiment, if the activation/deactivation MAC CE includes random access information, the UE transmits a Random Access Preamble according to the corresponding information.

According to an embodiment, if a PDCCH order command is received from the eNB, the UE sends the eNB a Random Access Preamble according to the corresponding command. if an RAR message is received in response to the Random Access Preamble, the UE adjusts the uplink timing information of the SCells belonging to the corresponding TAG and transmits uplink data through the corresponding cells.

If a contention-based random access execution command is received as the PDCCH order command or if the MAC layer of the UE initiates contention-based random access, the UE determines whether the contention has been resolved to perform contention-based random access additionally as described with reference to FIG. 16.

Although the UE is composed of a plurality of blocks responsible for different functions, such a configuration is just an example but not limited thereto. For example, the controller 1809 may be responsible for the functions of the carrier aggregation processor 1811.

In this case, the controller 1809 receives the timing information and calculates timing advance of the SCell based on the timing information. The controller 1809 may control to adjust the uplink timing according to the timing advance of the secondary cell and transmit uplink data in the duration of the time alignment timer for the SCell.

The timing information may be an offset value relative to the uplink timing of the currently activated PCell. The controller 1809 may calculate the timing advance for the SCell using the uplink timing of the PCell and the offset relative to the uplink timing of the PCell.

The controller 1809 may receive the timing information through a carrier aggregation configuration control message or a carrier activation message according to various embodiments of the present invention.

According to an embodiment of the present invention, the controller 1809 may receive the carrier activation message for activating the secondary cell before the receipt of the timing information and control to send the eNB the Random Access Preamble according to the Random Access Preamble identifier included in the carrier activation message and the resource index. In this case, the controller 1809 may control to receive the timing information through the random access response message transmitted by the eNB.

Figure 19:
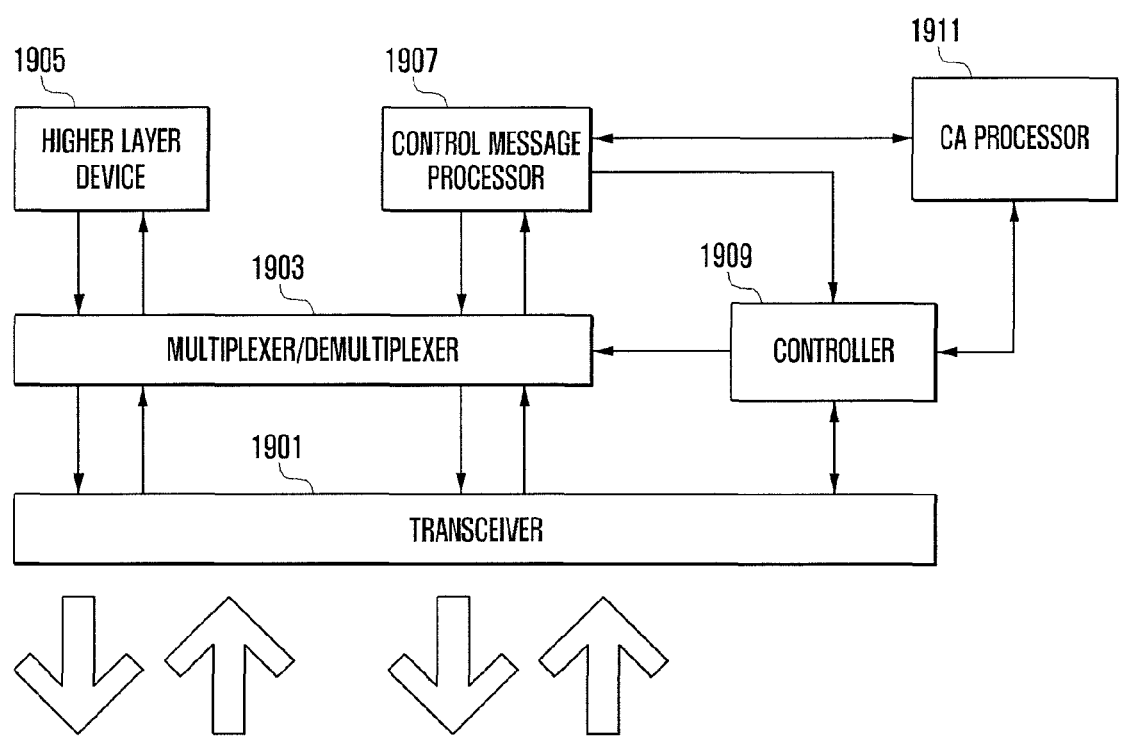
FIG. 19 is a block diagram illustrating a configuration of the eNB according to an embodiment of the present invention.

FIG. 19 is a block diagram illustrating a configuration of the eNB according to an embodiment of the present invention.

The eNB transmits/receives data generated by a higher layer device 1905 and control messages generated by a control message generator 1907. In transmission mode, the data is multiplexed by the multiplexer/demultiplexer 1903 and then transmitted through the transceiver 1901 under the control of the controller 1909. In reception mode, the physical signal is received by the transceiver 1901, demultiplexed by the multiplexer/demultiplexer 1903, and then delivered to the higher layer device 1905 or the control message processor 1907 according to the message information under the control of the controller 1909.

In order to command the UE to aggregate carriers, the eNB generates an RRC layer message (1907) and transmits the carrier aggregation configuration command. According to an embodiment, the eNB may transmit timing information on the TAG that is not synchronized yet in the RRC layer message.

Afterward, the eNB receives an acknowledgement message from the UE in response to the RRC layer message.

According to an embodiment, the eNB generates and transmits an activation/deactivation MAC CE to the UE. According to an embodiment, the activation/deactivation MAC CE includes the timing information on the SCells to be activated additionally for use in adjusting uplink timing of the corresponding SCells. According to an embodiment, the activation/deactivation MAC CE further includes random access information to command the UE to transmit a Random Access Preamble according to the corresponding information.

According to an embodiment, the eNB transmits a PDCCH order command and receives a Random Access Preamble from the UE according to the command. Afterward, the eNB calculates the timing based on the Random Access Preamble reception information and transmits the RAR message including the TA information.

If the Msg 3 is received from the UE, the eNB allocates resource to the UE through PDCCH addressed with the C-RNTI included in the Msg 3.

Through the proposed method, it is possible to reduce uplink transmission delay in the system supporting carrier aggregation technology with a plurality of uplink timings and allows the UE to determine the contention resolution accurately even when the contention resolution operates, resulting in avoidance of malfunctioning and improvement of operation accuracy.

Although the description has been made with reference to particular embodiments, the present invention can be implemented with various modification without departing from the scope of the present invention. Thus, the present invention is not limited to the particular embodiments disclosed but will include the following claims and their equivalents.

The invention claimed is:

1. An uplink transmission method of a terminal in a wireless communication system supporting carrier aggregation technology with a primary cell and at least one secondary cell, the method comprising:
   receiving a timing information for use in calculating timing advance of the at least one secondary cell;
   calculating the timing advance of the at least one secondary cell using the timing information; and
   transmitting uplink data by adjusting uplink timing according to the timing advance of the at least one secondary cell while a time alignment timer of the at least one secondary cell is running,
   wherein the timing information is received via a radio resource control (RRC) message for aggregating the at least one secondary cell to the primary cell.

2. The method of claim 1, wherein the timing information is a relative offset to an uplink timing of the primary cell activated currently.

3. The method of claim 2, wherein the calculating of the timing advance comprises calculating the timing advance of the at least one secondary cell using the uplink timing of the primary cell and a relative offset to the uplink timing of the primary cell.

4. The method of claim 3, wherein the receiving of the timing information comprises receiving the timing information through a carrier activation message for activating the at least one secondary cell.

5. The method of claim 1, further comprising:
receiving, before the receiving of the timing information, a carrier activation message for activating the at least one secondary cell; and
transmitting a random access preamble based on a random access preamble identifier and a resource index included in the carrier activation message to a base station.

6. The method of claim 5, wherein the receiving of the timing information comprises receiving the timing information through a random access response message transmitted by the base station.

7. A terminal for transmitting uplink data in a wireless communication system supporting carrier aggregation technology with a primary cell and at least one secondary cell, the terminal comprising:
a transceiver which transmits and receive to and from a base station; and
a controller configured to control:
receiving a timing information for use in calculating a timing advance of the at least one secondary cell,
calculating the timing advance of the at least one secondary cell using the timing information, and
transmitting the uplink data by adjusting uplink timing according to the timing advance of the at least one secondary cell while a time alignment timer of the at least one secondary cell is running,
wherein the timing information is received via a radio resource control (RRC) message for aggregating the at least one secondary cell to the primary cell.

8. The terminal of claim 7, wherein the timing information is a relative offset to an uplink timing of the primary cell activated currently.

9. The terminal of claim 8, wherein the controller calculates the timing advance of the at least one secondary cell using the uplink timing of the primary cell and the relative offset to the uplink timing of the primary cell.

10. The terminal of claim 9, wherein the controller receives the timing information through a carrier aggregation configuration control message for aggregating the at least one secondary cell to the primary cell.

11. The terminal of claim 7, wherein the controller further controls:
receiving, before the receiving of the timing information, a carrier activation message for activating the at least one secondary cell, and
transmitting a random access preamble based on a random access preamble identifier and a resource index included in the carrier activation message to a base station.

12. The terminal of claim 11, wherein the controller receives the timing information through a random access response message transmitted by the base station.

* * * * *